United States Patent
Ichitani et al.

(10) Patent No.: US 6,253,465 B1
(45) Date of Patent: Jul. 3, 2001

(54) MULTI-CHAMBER FLUIDIZED BED-CARRYING CLASSIFIER

(75) Inventors: Noboru Ichitani, Hyogo-Ken; Isao Hayashi, Takasago; Mikio Murao, Kobe, all of (JP)

(73) Assignee: Kawasaki Jukogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/582,585

(22) PCT Filed: Feb. 4, 1999

(86) PCT No.: PCT/JP99/00474

§ 371 Date: Jun. 28, 2000

§ 102(e) Date: Jun. 28, 2000

(87) PCT Pub. No.: WO00/25944

PCT Pub. Date: May 11, 2000

(30) Foreign Application Priority Data

Nov. 2, 1998 (JP) .................................................. 10-311885

(51) Int. Cl.⁷ ..................................................... F26B 21/00
(52) U.S. Cl. .................................. 34/565; 34/579; 34/583; 34/62; 34/168; 34/174; 209/139.1; 209/146
(58) Field of Search ............................. 34/558, 565, 579, 34/583, 62, 168, 174, 175, 176; 209/138, 139.1, 146, 147

(56) References Cited

U.S. PATENT DOCUMENTS 4,865,722 * 9/1989 Ririe et al. ............................ 209/474
5,351,832 * 10/1994 Abbot et al. ......................... 209/139.1
5,927,510 * 7/1999 Leute et al. .......................... 209/142

FOREIGN PATENT DOCUMENTS

| | | |
|---|---|---|
| 2-48785 U | 4/1990 | (JP) . |
| 5071875 | 3/1993 | (JP) . |
| 6-277495 | 10/1994 | (JP) . |
| 6-281110 | 10/1994 | (JP) . |
| 6-287043 | 10/1994 | (JP) . |
| 6-343927 | 12/1994 | (JP) . |
| 7-11270 | 1/1995 | (JP) . |
| 10-246573 | 9/1998 | (JP) . |
| 11-51314 | 2/1999 | (JP) . |

* cited by examiner

*Primary Examiner*—Pamela Wilson
(74) *Attorney, Agent, or Firm*—Oliff & Berridge, PLC

(57) ABSTRACT

A multi-chamber fluidized bed classifying apparatus comprising; a main chamber having a fluidized bed arranged on wind boxes, through a perforated gas distributing plate is divided into a drying chamber and a classifying chamber by a partition plate, and a communication passage is defined under the plate. The wind boxes have respective lower ends connected to discharge devices respectively. The wind box is connected to a processing fluidization gas supply system for supplying the fluidization gas into the box, while the wind box is connected to a classifying fluidization gas supply system for supplying the fluidization gas into the box. The classifying fluidization gas supply system is provided with a flow control unit which adjusts the quantity of gas supplied into the classifying chamber to control the size of classified particles. The processing fluidization gas supply system is provided with a control unit, which adjusts the gas quantity and/or the temperature of gas supplied into the drying chamber.

17 Claims, 18 Drawing Sheets

MULTI-CHAMBER FLUIDIZED BED-CARRYING CLASSIFIER

BACKGROUND OF THE INVENTION

1. Technical Field of the Invention

The present invention relates to a multi-chamber fluidized bed classifying apparatus in which a raw material having a wide particle size distribution, such as coal, slug, etc., are dried, heated or cooled and which classifies the raw material into fines (powder) and grains.

2. Description of the Related Art

As the conventional fluidized bed classifying apparatus, there is an apparatus disclosed in Japanese Unexamined Patent Publication (kokai) No. 6-343927. In the apparatus, it is performed to control the size of particles to be classified (corresponding to "flowing velocity in free board) by adjusting the flowing velocity of fluidization gas forming a fluidized bed. In this way, the material is separated into the grains remaining in the fluidized bed and the fines scattering from the bed into the free board. In the same apparatus, thereafter, the grains is withdrawn from the fluidized bed, while the exhaust gas containing the fines is extracted out of the free-board to collect the fines by means of a cyclone or the like.

In the Publication No. 6-343927, it is described that an auxiliary gas for classification is introduced into an discharge chute for discharging the grains from the fluidized bed, thereby preventing the fines having a particle size smaller than a predetermined particle size from entering into the discharge chute. In the same publication, it is also described that the inside temperature of the fluidized bed is monitored and thereupon, the fluidization gas forming the fluidized bed is heated so that the so-monitored temperature reaches a specified temperature necessary to dry the raw material.

As an example of the apparatus in which its interior having a fluidized bed is divided into plural chambers, there is known a fluidized bed drying apparatus shown in Japanese Unexamined Utility Model Publication (kokai) No. 2-48785. In the apparatus, a fluidizing chamber having the fluidized bed is divided into plural chambers by a partition plate while remaining a clearance against a gas diffusing plate. On the downstream side of the partition plate in the flowing direction of the fluidized bed, a dam plate is arranged in parallel with the partition plate. Between the partition plate and the dam plate, gas is spouted upward in order to establish both uniform residence time of the dried material and uniform dryness thereof.

In case of processing the raw material (e.g. coal, slug, etc.) in the fluidized bed, there exist coarse particles which are not fluidized due to their wide particle size distribution despite that the fluidized bed is defined by spouting the fluidization gas from the downside of the gas distributing plate.

In order to transfer the coarse particles which are not fluidized, Japanese Unexamined Patent Publication (kokai) No. 5-71875 discloses a fluidized bed apparatus which ejects the gas obliquely upward along an inclined face of the gas distributing plate so that the grains can jump over a jumping table.

Additionally, Japanese Unexamined Patent Publication (kokai) No. 6-281110 also discloses a large lump discharge apparatus for discharging large lumps from the fluidized bed. In the apparatus, a gas distributing plate is arranged in a fluidized bed furnace. At the intermediate position of the gas distributing plate, the fluidized bed furnace is provided, on a bottom part thereof, with a recess. Further, a large lump discharge chute is arranged so as to penetrate a wind box. The upper end of the large lump discharge chute is inserted into the recess, for discharging large lumps from the apparatus.

For the conventional built-in gas distributing plate in the fluidized bed apparatus, there are generally known a gas distributing plate in the form of a cap and a perforated gas distributing plate having numerous gas ejection holes.

Japanese Unexamined Patent Publication (kokai) No. 6-287043 discloses a cement-clinker burning apparatus which includes a fluidized-bed burning furnace arranged below a gas distributing plate in a fluidized-bed granulating furnace. In operation, the granulated material is thrown into the fluidized bed burning furnace via a discharge gate facing the fluidized bed in the fluidized bed granulating furnace. This cement-clinker burning apparatus is provided with ventilating means for blowing gas from the discharge gate into the fluidized-bed granulating furnace. The apparatus further includes a classifying gate constructed to enter into or leave out the discharge gate through the lateral side of the furnace body. Owing to the provision of the classifying gate, the opening area of the discharge gate can be adjusted larger or smaller to extract the fines out of the particles falling from the discharge gate.

In the fluidized bed classifying apparatus of Japanese Unexamined Patent Publication (kokai) No. 6-343927, it is executed to control a gas quantity of the fluidization gas in order to regulate the classified particle size. However, there actually exists a gas-quantity adjustable range necessary for maintaining the fine and stable fluidized bed. Therefore, there is a case that it is impossible to control the fluidization gas so as to have both gas quantity and temperature necessary for the drying process or the like, while maintaining the proper fluidized bed without influencing the apparatus'classifying performance. Additionally, by only supplying the classification auxiliary gas into the discharge chute for grains, it is impossible to obtain a sufficient secondary classifying effect to separate the fines (powder) finer than the classified particle size. Further, if it is necessary to exchange the perforated gas distributing plate subjected to wear, corrosion, etc., then enormous time and cost would be required. If the raw material contains many large lumps because of its wide particle size distribution, the large lumps may stay right under a material loading part of the apparatus, causing a standstill of fluidization.

The conventionally-known gas distributing plate of cap type is not suitable to treat the grains of a wide particle size distribution because there is a large "particle" dead area causing the large lumps to be remained immovably. Additionally, the same plate has problems of worn caps and blocked nozzles. On the contrary, the perforated gas diffusing plate is capable of full fluidization in spite of somewhat large lumps in the raw material, on condition that the plate is appropriately designed on consideration of the uniformity of spouting, the immovable part of particles among the nozzles, jet height, etc. Therefore, the perforated gas diffusing plate is superior to the former plate against wear and blocking. Nevertheless, there is a fault that a relatively great amount of processed articles fall from the plate, causing the falls to be stacked in the wind box.

In the multi-chamber fluidized bed drying apparatus as shown in Japanese Unexamined Utility Model Publication (kokai) No. 2-48785, if only the particle size of material to be dried is generally uniform, then both uniform residence time and uniform dryness are accomplished to some extent. Nevertheless, when processing the powder and granular material having a wide particle size distribution, it is impossible to discharge the processed material to the downstream side of the apparatus since the coarse particles and the large lumps are stacked underside the partition plate.

The apparatus described in Japanese Unexamined Patent Publication (kokai) No. 5-71875 requires spouting the gas at a considerably high speed. Consequently, the gas distributing plate is easy to be worn because of its high pressure loss, requiring enormous time and cost for the replacement of the worn plate with a new one. Furthermore, since the gas distributing plate is complicated in structure, the maintenance is troublesome and complicated. Also, since the maximum transferable particle size depends on the spouting speed of gas, there is a case of large lumps staying on the gas distributing plate, so that the apparatus may be standstill in operation. In order to transfer the grains certainly, it is necessary to increase the flowing speed of the fluidized bed, causing the scattering quantity of fines to be increased.

In the apparatus described in Japanese Unexamined Patent Publication (kokai) No. 6-281110 where the large lumps are discharged through the gas distributing plate and the center of the wind box, the apparatus is complicated in structure. Moreover, it is impossible to discharge the large lumps certainly and finally, the large lumps are gradually stacked as time passes, so that the fluidization itself of the fluidized bed is deteriorated.

In the system described in Japanese Unexamined Patent Publication (kokai) No. 6-287043 where the classifying gate is arranged on the bottom of the fluidized-bed granulating furnace, the particles are classified and discharged while being drifted in the gas current on the bottom of the fluidized-bed granulating furnace. Thus, using the classification gas at a small flowing speed in classifying the fines, the particles enter into the classifying sections in the chute once and for all, so that the respective sections are filled up with the particles. Therefore, it is impossible to exhibit the classification effect sufficiently.

SUMMARY OF THE INVENTION

Accordingly, it is therefore an object of the present invention to provide a multi-chamber fluidized bed classifying apparatus having the following possibilities. First, the apparatus is capable of at least one of drying, heating and cooling the raw material, such as coal and slug, having a wide particle size distribution. Second, the apparatus can define a fluidized bed for classifying the material into fines and grains. Third, the apparatus can maintain the appropriate and stable fluidized bed without influencing on the classifying capability and adjust the gas quantity and/or the gas temperature necessary for the processes of drying, heating, cooling, etc. Additionally, the object of the invention is directed to provide the multi-chamber fluidized bed classifying apparatus which has a simple and cheep in structure and which is safe and easy in operation and maintenance.

It is another object of the invention to provide the multi-chamber fluidized bed classifying apparatus which is capable of improving the classification effect while considerably reducing the possibility of mixing the fines into the grains as the processed material and which can maintain the stable fluidized bed in spite of much coarse particles and large lumps in the raw material and also prevent the large lumps from entering into the objects to be processed.

In order to accomplish the above-mentioned objects, the multi-chamber fluidized bed classifying apparatus of the present invention applies at least one of drying, heating and cooling on powder and granular material and further includes a fluidized bed for classifying the powder and granular material into fines and grains. The apparatus is characterized in that:

a main body is provided above a wind box through a perforated gas distributing plate having;

a chamber having the fluidized bed in the main body is divided into at least one processing chamber arranged on the upstream side of the main body and a classifying chamber arranged on the downstream side of the main body, by a vertical partition plate;

a communication passage is defined under the partition plate or in a lower part of the partition plate;

the wind box below the perforated gas distributing plate comprises hopper-shaped wind boxes corresponding to the respective chambers;

discharge units are connected with the lowermost ends of the wind boxes, for discharging "falls" falling into the wind boxes continuously;

a processing fluidization-gas supply system is connected to the wind box on the processing chamber's side, for supplying fluidization gas used for at least one of drying, heating and cooling processes into the wind box;

a classifying fluidization-gas supply system is connected to the wind box on the classifying chamber's side, for supplying fluidization gas used as classifying gas into the wind box;

a material supply chute is connected to an end of the processing chamber on the uppermost stream side, for supplying the powder and granular material into the main body;

a grains discharge chute is connected to another end of the classifying chamber on the lowermost stream side, for discharging the processed coarse brain from the main body;

gas exhaust ports are arranged on the processing and classifying chambers, for spouting exhaust gas containing the fines;

flow control means is arranged in the classifying fluidization-gas supply system, for controlling a quantity of the fluidization gas supplied into the wind box on the classifying chamber's side thereby to control a classified particle size (corresponding to a flowing velocity in a free board); and control means is arranged in the processing fluidization-gas supply system, for controlling at least one of quantity and temperature of the fluidization gas supplied into the wind box on the processing chamber's side. (see FIGS. 1 and 21–24).

Note, the falls discharge units may be constructed so as to discharge the falls corresponding to the quantity of the falls intermittently. Stainless steels, such as SUS 304 (according to Japanese Industrial Standard Classification), are suitable for the material of the perforated gas distributing plate, in view of the prevention of corrosion.

In the above apparatus of the invention, it is preferable that the communication passage defined under the partition plate or in the lower part of the partition plate has a variable opening area (see FIGS. 2 to 9). In this case, the communication passage may include: a gate capable of vertical movement (see FIGS. 2 to 4); a number of horizontal or inclined short pipes (see FIGS. 5 to 7); or a rotatable plate body (see FIGS. 8 and 9). Of course, so long as the opening area is variable, any other structures may be adopted as the communication passage.

In the above apparatus, it is preferable that the gas exhaust port of at least one processing chamber is connected to a solid/gas separator which has its lower part connected to the classifying chamber through a powder extraction pipe (see FIG. 21). In this case, even if the scattering of fines in the processing chamber is large, the classifying capability is not influenced since the fines are trapped by the solid/gas separator and subsequently loaded into the classifying chamber. For example, a cyclone, a bag filter, etc. are applicable to the solid/gas separator.

In the present invention, preferably, the above apparatus further comprises a large lump discharge device for discharging coarse particles more than a particle size whose fluidized bed superficial velocity is equal to a fluidization starting velocity thereof. The large lump discharge device is connected with the perforated gas distributing plate under the fluidized bed just blow the material supply chute and environs (see FIG. 10). Then, if the large lump discharge device operates to discharge the coarse particles (large lamps) on condition that the quantity of coarse particles each having a particle size whose fluidized bed cavity velocity is equal to its fluidization minimum velocity is more than 8 wt. % of the whole quantity to be processed, desirably, 3 wt. %, then it is possible to maintain the stable fluidized bed certainly.

In the present invention, preferably, the above apparatus further comprises an exchangeable liner mounted on the perforated gas distributing plate, for preventing it from being worn (see FIGS. 11 and 12). Note, stainless steels of SUS 304 etc. are suitable for the material of the liner, in view of the prevention of not only frictional wear but also corrosion.

In the present invention, preferably, the above apparatus further comprises a dam arranged in the vicinity of the perforated gas distributing plate's end on the side of the material exhaust port and a classifying gas introductory nozzle connected to the grains discharge chute, for returning the fines overflowing the dam to the classifying chamber (see FIGS. 13 to 16).

Alternatively, it is also preferable that the multi-chamber fluidized bed classifying apparatus of the invention further comprises a dam arranged in the vicinity of the perforated gas distributing plate's end on the side of the grains discharge chute, a classifying plate arranged above the dam, for reducing a cross-sectional area of a space defined between the classifying plate and the dam thereby to improve the classification efficiency of the apparatus, and a classifying gas introductory nozzle connected to the grains discharge chute, for allowing gas to flow between the dam and the classifying plate thereby to return the fines overflowing the darn to the classifying chamber (see FIGS. 13 to 16). Note, if the height of a ceiling part above the discharge part of the material is established suitably, then the classifying plate may be eliminated.

In the above apparatus of the invention, at least either one of the dam and the classifying plate is preferably adjustable in terms of its height so that the cross-sectional area of the space defined between the classifying plate and the dam can be varied to control the classification quantity (see FIGS. 13 to 16). In case of the adjustable dam in its height, it is possible to control a height of the dam, that is, a height of the fluidized bed, in accordance with sorts of the particles.

Alternatively, it is also preferable that at least either one of height and angle of the classifying plate is adjustable so that the cross-sectional area of the space defined between the classifying plate and the dam can be varied to control a classification quantity. In this way, the apparatus is preferably constructed so as to perform an appropriate secondary classification by the adoption of the adjustable classifying plate in height (see FIGS. 13 and 14) or the same of flap type in angle (see FIGS. 15 and 16). Note, in case of the adjustable classifying plate of flap type, the classifying plate's inclination having its lower end directing the interior of the main body would allow the falling fines to be returned into the main body.

In the apparatus of the invention, preferably, a clearance (or slit) is defined between a lower end of the dam and an upper face of the perforated gas distributing plate, for allowing the movement of large lumps.

In the apparatus of the invention, it is preferable that the material exhaust port is divided by a partition wall so as to define a large lump discharge chute on the perforated gas distributing plate's side of the material exhaust port and that the large lump discharge chute is provided, on its lateral side, with a fluidization gas blowing nozzle for allowing the fluidization of particles in an upper part of the large lump discharge chute thereby to discharge the large lumps selectively (see FIGS. 17 and 18). In connection, the flowing velocity of the fluidization gas blown through the fluidization gas blowing nozzle is one to three (1–3) times, desirably, one-and-a-half to two (1.5–2) times as much as the minimum fluidization velocity. When the minimum fluidization velocity is less than a minimum value within the above range, the large lumps are difficult to move. On the contrary, when the minimum fluidization velocity is less than a maximum value within the above range, then it is also difficult to discharge the large lumps selectively due to the excessive mixing of particles in the discharge chute with the same in the fluidized bed.

In the present invention, preferably, the grains discharge chute has a large lump discharge chute which is arranged on the perforated gas distributing plate's side adjacent to an discharge part of the grains discharge chute and also connected with a large lump discharge chute. Also in the case, the large lump discharge chute is preferably provided, on its lateral side, with a fluidization gas blowing nozzle for allowing the fluidization of particles in an upper part of the large lump discharge chute thereby to discharge the large lumps selectively (see FIGS. 17 and 19).

Alternatively in the present apparatus, preferably, the grains discharge chute is divided by a partition wall so as to define a large lump discharge chute on the perforated gas distributing plate's side of the material exhaust port; the large lump discharge chute is provided, on its lateral side, with a fluidization gas blowing nozzle for allowing the fluidization of particles in an upper part of the large lump discharge chute thereby to discharge the large lumps selectively; the large lump discharge chute has a slanted part formed on a lower section of the large lump discharge chute, the slanted part having, on its bottom side, a partition wall providing a sieve structure at least partially; and the grains discharge chute further includes another partition wall for forming a space below the sieve structure, whereby small particles diving into the large lump discharge chute can be sieved into the space below the sieve structure and finally returned to the grains discharge chute (see FIG. 20).

In the above apparatus of the invention, it is preferable to arrange the partition wall in a manner that its upper end is higher than an upper face of the perforated gas distributing plate (see FIGS. 17 and 20). In general, the product (coarse particle) of slug has 2–3 mm in particle size, while the large lump has 80–100 mm in particle size. Therefore, for example, when cooling the slug, the upper end of the partition wall is 100–200 mm higher than the upper face of the perforated gas distributing plate in order to prevent the large lumps from entering into the discharge chute for the grains.

The above and other features and advantages of this invention will become apparent, and the invention itself will best be understood, from a study of the following description and appended claims, with reference had to the attached drawings showing preferred embodiments of the invention.

DESCRIPTION OF THE PREFERRED EMBODIMENT

Preferred embodiments of the present invention will be described with reference to the drawings. Nevertheless, the present invention is not limited to these embodiments only and the invention may be embodied in other modifications appropriately.

Figure 1:
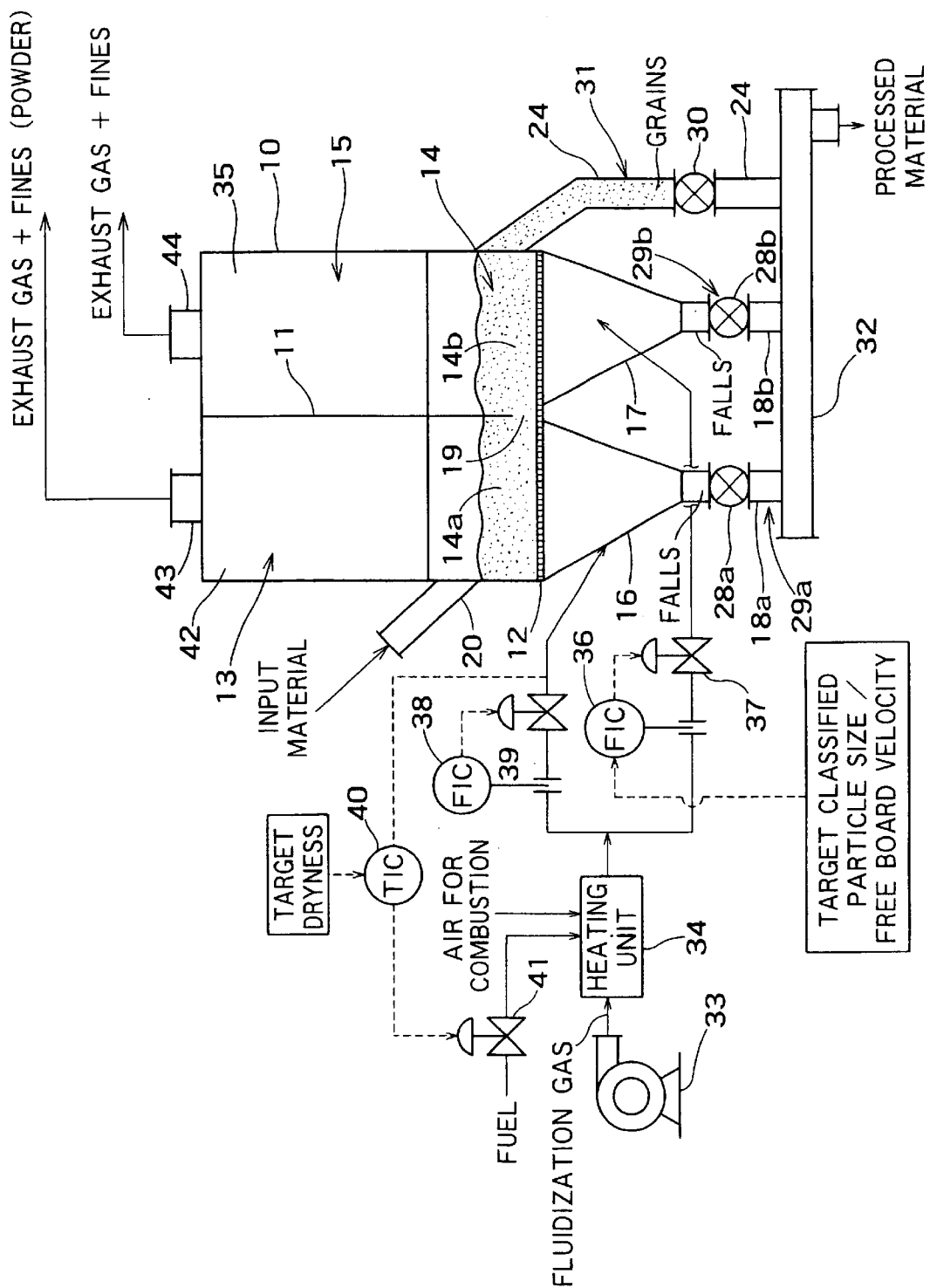
FIG. 1 is a schematically systematic diagram showing the constitution of a multi-chamber fluidized bed classifying apparatus (in case of one drying chamber and one classifying chamber) in accordance with the first embodiment of the invention.

FIG. 1 illustrates one example of the multi-chamber fluidized bed classifying apparatus in accordance with the first embodiment of the present invention. In the embodiment, as one example, a chamber having the fluidized bed is partitioned into two chambers: a drying chamber on the upstream side; a classifying chamber on the downstream side. Note, in the modification, the chamber having the fluidized bed may be partitioned into three chambers.

As shown in FIG. 1, a box-shaped main body 10 is provided, on a lower side thereof, with a perforated gas distributing plate 12 on which a fluidized bed 14 including an input material (e.g. powder coals) constituting a bed material is defined. A chamber containing the fluidized bed 14 is vertically partitioned into two chambers through a partition plate 11. The two chambers comprise a drying chamber 13 on the upstream side of the fluidized bed 14 and a classifying (or grading) chamber 15 on the downstream side.

On the underside of the partition plate 11, there is defined, as one example, a communication passage 19 having a variable opening area, which will be described in detail, later.

On one side of the main body 10 above the fluidized bed 14a in the drying chamber 13, a material supply chute 20 is providing for loading a powder and granular material to be processed, into the chamber 13. While, on the other side of the body 10 close to the fluidized bed 14b in the classifying chamber 15, an exhaust device 31 is connected to discharge the processed material (i.e. dried grains). The device 31 comprises an discharge chute 24 and an discharge unit 30.

Under the perforated gas distributing plate 12, there are wind boxes 15, 16 each having a configuration of hopper (having a longitudinal section of generally inverse-triangle and its bottom opened), which correspond to the fluidized bed 14a of the drying chamber 13 and the fluidized bed 14b of the classifying chamber 15, respectively. Connected with respective lower ends of the hopper-shaped wind boxes 16, 17 are "falls" discharge devices 29a, 29b which comprise discharge units 28a, 28b for discharging the particles falling into the wind boxes 16, 17 and "falls" discharge chutes 18a, 18b, respectively. For the discharge units 28a, 28b and 30, an discharge machine that opens and closes by a gate damper, a rotary feeder and a cam mechanism; an discharge machine, which opens and closes by the balance of weights; etc. may be employed.

The "falls" exhaust chutes 18a, 18b and the "processed material" discharge chute 24 are together connected with a conveyer 32 having one end through which the processed material is to be unloaded. For the conveyer 32, there may be used a screw conveyer, a belt conveyer, a chain conveyer, etc.

Next, the multi-chamber fluidized bed classifying apparatus of FIG. 1 will be described with regard to its operation. First, it is carried out to load the powder and granular material (i.e. objects to be processed), such as wet coals, through the material supply chute 20 and simultaneously supply the fluidization gas into the wind boxes 16, 17, respectively. The fluidization gas to the wind box 16 is used for not only forming the fluidized bed 14a of the objects to be processed, but drying the same. While, the fluidization gas to the wind box 17 is used for not only forming the fluidized bed 14b of the objects but also classifying the same in terms of gas quantity, independently.

Fresh air fed from a fan 33 is supplied to a heater 34, such as a hot blast stove having fuel and air in combustion, so that the fluidization gas in the form of heated air can be supplied to the wind boxes 16, 17. For the heater 34, the hot blast stove of direct-heating type may be replaced by an indirect-heater.

Concretely, in order to control both classified particle size and dryness in the apparatus of FIG. 1, since the classified particle size is determined by the flowing velocity of "free board", it is executed to establish the flowing velocity of a free board 35 capable of a desired classified particle size. In other words, there is determined a gas quantity to be blown into the classifying chamber 15, which accomplishes the target particle size. Upon this establishment, the operations of a calculating unit (not shown), a flow indication controller (FIC) 36 and a flow control valve 37 are respectively controlled so that the gas quantity of the fluidization gas supplied to the wind box 17 allows the formation of an appropriate fluidized bed in the classifying chamber 15 and realizes the above-established value.

Similarly, upon the establishment of gas flow allowing the formation of an appropriate fluidized bed, a flow indication controller (FIC) 38 and a flow control valve 39 are also controlled so that the blowing amount of gas into the drying chamber 13 maintains the above-established gas flow constantly. Then, it is further carried out to measure the moisture content of the processed particles (water at outlet) and calculate the dryness from a difference between the moisture content of the processed particles and the same of the loaded material (water at inlet) although concrete elements are not shown. If there is a difference between the so-calculated dryness and a target dryness, then the temperature of hot blast supplied into the drying chamber 13 is altered and furthermore, the operations of a not-shown calculating unit, a temperature indication controller (TIC) 40 and a fuel control valve 41 are controlled so that the temperature of the fluidization gas supplied into the wind box 16 amounts to the so-altered temperature.

The fluidization gas, of which gas quantity and dryness are adjusted so as to form the appropriate fluidized bed and attain the target dryness, is introduced to the wind box 16 in the drying chamber 13 and ejected from the perforated gas distributing plate 12 to fluidize the particles to be processed, forming the fluidized bed 14a. The fines (powder) flying a free board 35 in the drying chamber 13 are discharged from a gas exhaust port 43 together with the exhaust gas.

In the material dried in the drying chamber 13, the particles having passed through the communication passage 19 are classified in the classifying chamber 15. It is noted that, in the dried material in the drying chamber 13, the particles falling through the nozzles in the perforated gas distributing plate 12 are discharged from the "falls" discharge device 29a.

The particles passing through the communication passage 19 form a fine fluidized layer in the wind box 17 of the classifying chamber 15 and the fluidized bed 14b in the classifying chamber 15 with the supply of fluidization gas of the gas quantity controlled so as to attain the target classified particle size. The fines less than the classified particle size are scattered in the free board 35 and discharged out of the gas exhaust port 43 together with the exhaust gas. While, the grains each larger than the classified particle size are discharged from the "grains" discharge device 31, as the grains (products). Note, a portion of processed particles in the classifying chamber 15 falls through the nozzles in the perforated gas distributing plate 12 and thereafter, the "falls" are discharged from the falls discharge device 29b. The falls from the drying chamber 13 and the classifying chamber 15 may be together discharged from the wind boxes 16, 17 continuously. Alternatively, the falls may be intermittently discharged in case of their small quantities etc. Of course, when discharging the falls in succession, the discharge units 28a, 28b are operated continuously.

Next, we describe a modification that the communication passage 19 has a variable opening area in the above-mentioned apparatus of the first embodiment of the invention.

Figure 2:
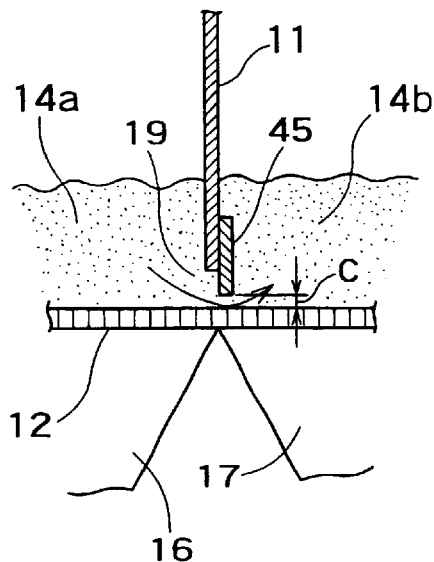
FIG. 2 is an enlarged longitudinally-sectional view showing the vicinity of a communication passage having a gate in vertical movement, in the above classifying apparatus of the first embodiment of the invention.
Figure 3:
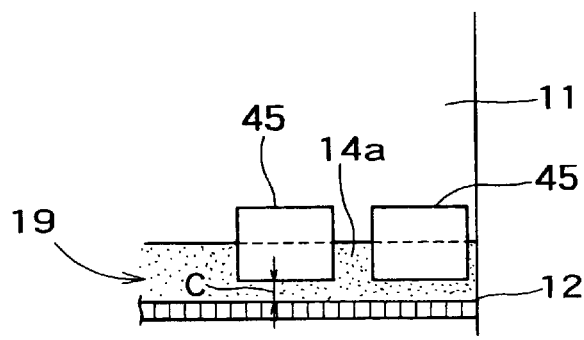
FIG. 3 is a right side view schematically showing the vicinity of the communication passage of FIG. 2.
Figure 4:
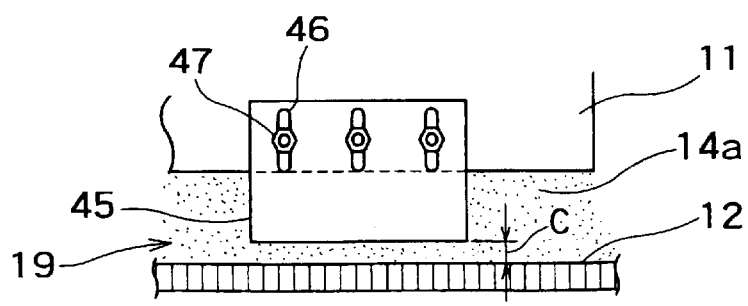
FIG. 4 is an enlarged view showing one example of adjusting means for a clearance of FIG. 3.

FIGS. 2 to 4 show the arrangement to construct the communication passage 19 by a gate capable of vertical movement. As shown in FIG. 2, a gate 45 is movably attached to a lower part of the partition plate 11. The adjustment of a clearance C between the gate 45 and the perforated gas distributing plate 12 allows the opening area of the communication passage 19 to be changed at will. FIG. 3 shows the arrangement where the gates 45 of the plural number are provided in the communication passage 19. Or otherwise, a piece of gate 45 may be arranged in the whole communication passage 19. As means for adjusting the clearance C, an adjusting arrangement shown in FIG. 4 may be given as an example. In the arrangement, the gate 45 is provided, on its upper part, with long holes 46 into which bolts 47 are fitted for adjustably fixing the gate 45 with the plate 11 at a designated position. Apropos of this, it is necessary to adjust the clearance C in a manner that the resultant opening area does not cause so-called "back-mixing" in the communication passage 19.

Figure 5:
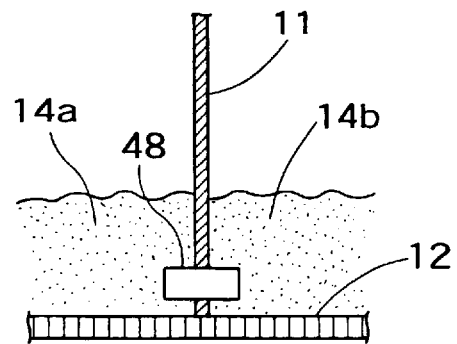
FIG. 5 is an enlarged longitudinally-sectional view showing the vicinity of the communication passage consists of some short pipes in horizontal arrangement, in the above classifying apparatus of the first embodiment of the invention.
Figure 6:
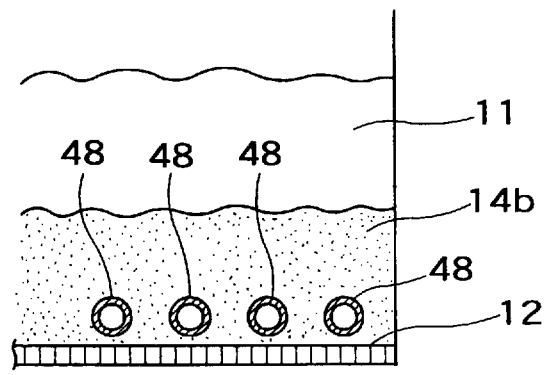
FIG. 6 is a right side view schematically showing the vicinity of the communication passage of FIG. 5.
Figure 7:
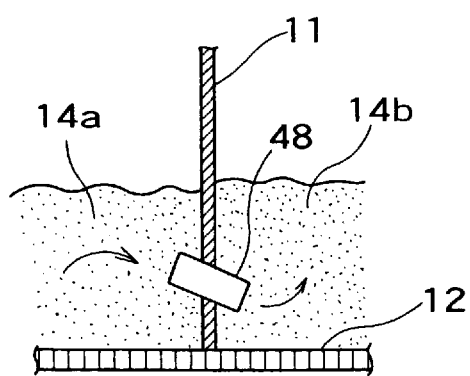
FIG. 7 is an enlarged longitudinally-sectional view showing the vicinity of the communication passage consists of some short pipes in inclined arrangement, in the above classifying apparatus of the first embodiment of the invention.

FIGS. 5 to 7 show the modification where a number of horizontal or inclined short tubes (e.g. pipes) constitute the communication passage 19. As shown in FIGS. 5 and 6, a plurality of pipes 48 are fitted to the lower part of the partition plate 11 almost horizontally. As shown in FIG. 7, each pipe 48 may be inclined or formed with an optional length and thickness. Further, the pipe 48 may be provided, at an interior thereof, with a damper allowing the opening area to be varied. When employing the inclined pipe, it is preferable that the pipe's end in the fluidized bed 14a of the drying chamber directs upward in order to facilitate the movement of dried material.

Figure 8:
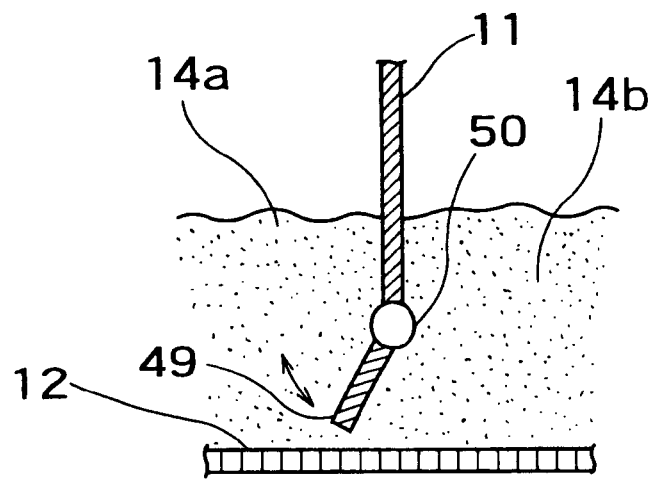
FIG. 8 is an enlarged longitudinally-sectional view showing the vicinity of the communication passage having a rotatable plate body, in the above classifying apparatus of the first embodiment of the invention.
Figure 9:
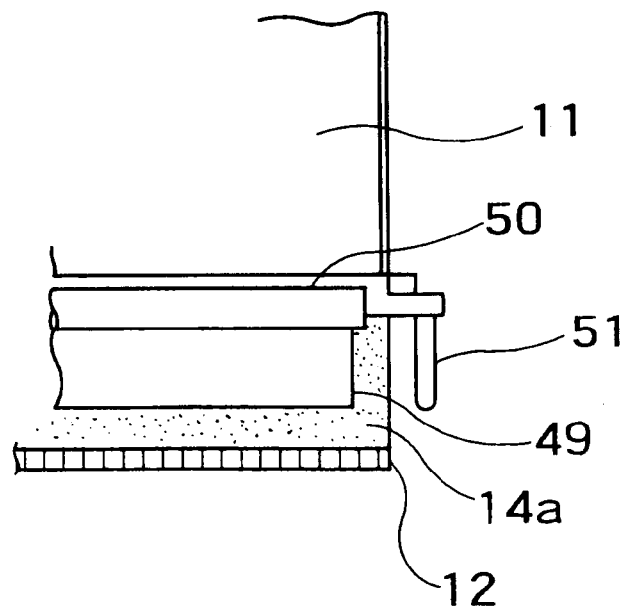
FIG. 9 is a right side view schematically showing the vicinity of the communication passage of FIG. 8.

FIGS. 8 and 9 show the arrangement where a rotatable plate body constitutes the communication passage 19. As shown in these figures, a plate body 49 is rotatably attached to the lower part of the partition plate 11 through an attachment shaft 50. In FIG. 9, the rotatable attachment shaft 50 is connected with a handle 51 outside the apparatus. The outside manipulation of the handle 51 allows the plate body 49 to be rotated about the shaft 50, so that the angle of the plate body 49 can be changed to adjust the opening area of the communication passage. Although FIG. 9 only illustrates one example of the single plate body 49 constituting the communication passage, it may be provided with two plate bodies allowing the adjustment from both sides of the apparatus in the modification and otherwise, three or more plate bodies may be attached to the partition plate 11.

Figure 10:
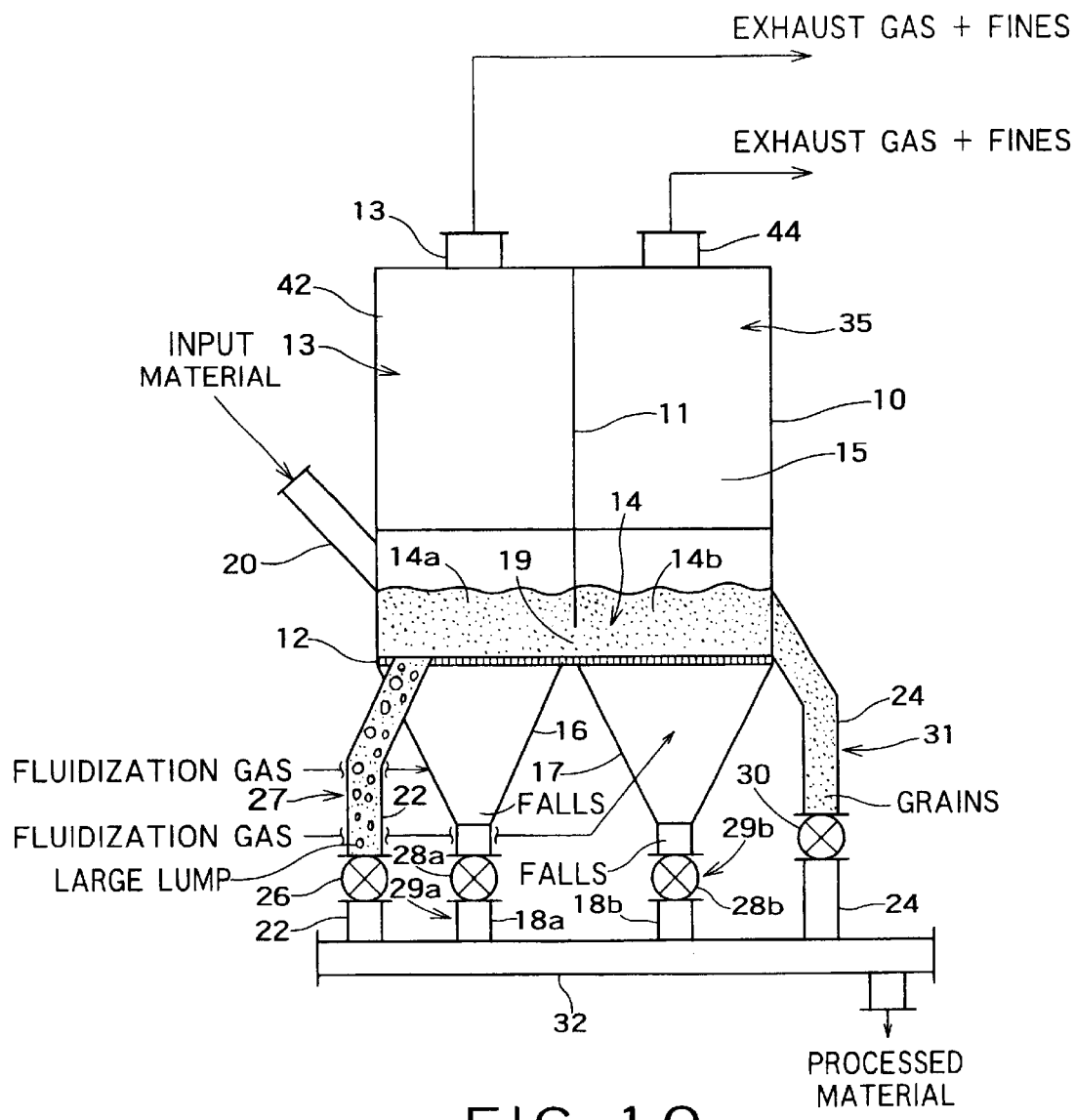
FIG. 10 is a schematically-structural view of the classifying apparatus of the first embodiment, also showing a large lump discharge unit which is arranged below the fluidized bed and just below a material input.

FIG. 10 shows an essential part of the classifying apparatus of the first embodiment, provided with a large lump discharge unit under the fluidized bed just below the material input of the apparatus. In FIG. 10, the box-shaped main body 10 is provided, on its lower side, with the perforated gas distributing plate 12 on which the fluidized bed 14 including the input material constituting the bed material is defined. The chamber containing the fluidized bed 14 is vertically partitioned into two chambers through the partition plate 11. The two chambers comprise the drying chamber 13 on the upstream side of the fluidized bed 14 and the classifying chamber 15 on the downstream side. The communication passage 19 having its variable opening area is defined under the partition plate 11. Also in this arrangement, the communication passage 19 may include the above-mentioned elements shown in FIGS. 2 to 9.

Underside the perforated gas distributing plate 12, the hopper-shaped wind boxes 15, 16 are arranged so as to correspond to the fluidized bed 14a of the drying chamber 13 and the fluidized bed 14b of the classifying chamber 15, respectively. The "falls" discharge devices 29a, 29b are connected with respective lower ends of the hopper-shaped wind boxes 16, 17. The "falls" discharge devices 29a, 29b comprise the discharge units 28a, 28b for discharging the particles falling into the wind boxes 16, 17 and the "falls" discharge chutes 18a, 18b, respectively.

On one side of the main body 10 above the fluidized bed 14a in the drying chamber 13, the material intake port 20 is providing for loading the powder and granular material to be processed, into the chamber 13. Connected with the perforated gas distributing plate 12 below the material supply chute 20 is a large lump discharge device 27 which consists of a large lump discharge chute 22 and an discharge unit 26. For the discharge unit 26, it may be selected from an discharge machine which opens and closes by a gate damper, a rotary feeder and a cam mechanism; an discharge machine which opens and closes by the balance of weights; etc.

In order to discharge the grains, the "grains" discharge device 31 is connected to the other side of the main body 10 close to the fluidized bed 14b in the classifying chamber 15. The device 31 consists of the "grains" discharge chute 24 and the discharge unit 30.

The large lump discharge chute 22, the "falls" discharge chutes 18a, 18b and also the "grains" discharge chute 24 are all connected with the conveyer 32 for transporting the processed material to a conveyer's end. At the conveyer's end, the processed material containing large lump is withdrawn. Note, upon disconnecting the large lump discharge chute 22 from the conveyer 32, the apparatus may be adapted so as to withdraw only the large lumps independently.

We now describe the operation of the essential part of the apparatus of FIG. 10.

Owing to the fluidization gas introduced to the wind box 16 in the drying chamber 13 and ejected from the perforated gas distributing plate 12, the fluidized bed 14a is formed in the drying chamber 13 and simultaneously, the particles to be processed are dried and the large lumps are discharged into the large lump discharge device 27 through large lump part formed in the plate 12. In the dried material, the particles falling through the nozzles (ejection holes) in the plate 12 are discharged from the "falls" discharge device 29a.

In the dried material, the particles brought into the classifying chamber 15 through the communication passage 19 form the fluidized bed 14b and is classified into the fines finer than the classified particle size and the processed material (grains), owing to the fluidization gas fed to the box 17 and spouting from the plate 12. Thus, the fines scattering in the free board 35 is discharged through the gas exhaust port 44 together with the exhaust gas, while the grains is discharged from the "grains" discharge device 31. The particles falling through the nozzles in the plate 12 are discharged from the "falls" discharge device 29a.

In this case, the cluster large lump discharge device 27 is operated to discharge the large lumps contained in the processed material (or dried material) when the particles each exceeding a particle size (e.g. 10–15 mm in case of drying coals) whose fluidized bed superficial velocity is equal to its minimum fluidization velocity thereof, amount more than 3–8 wt. %. Other constitution and operation of the apparatus are similar to those of the apparatus of FIG. 1.

Figure 11:
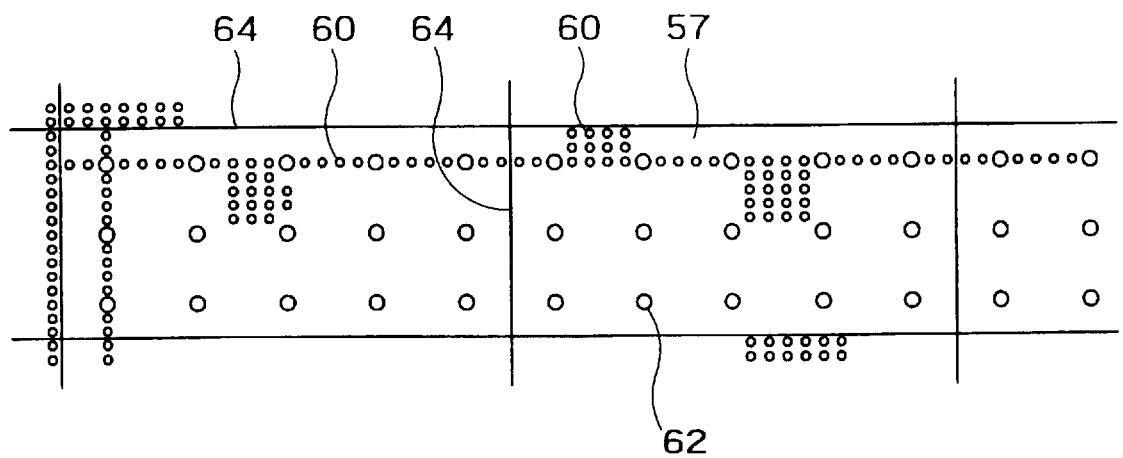
FIG. 11 is a schematically-plan view of the classifying apparatus of the first embodiment, also showing a liner mounted on a perforated gas distributing plate.
Figure 12:
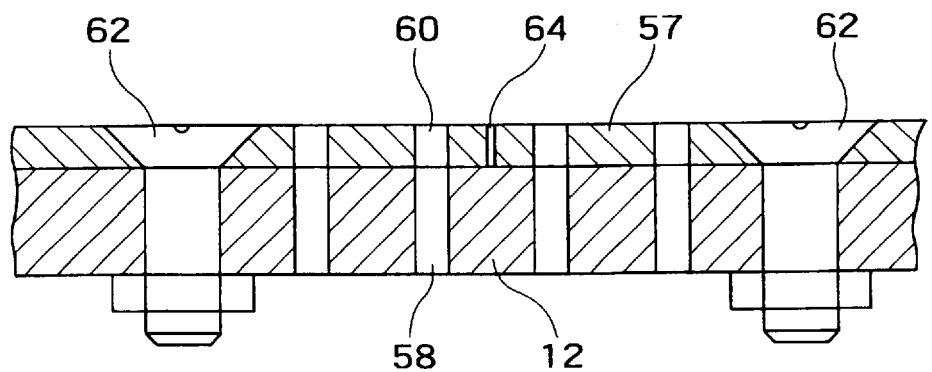
FIG. 12 is a schematically-enlarged sectional view of the classifying apparatus of the first embodiment, also showing the liner mounted on the perforated gas distributing plate.

FIGS. 11 and 12 show one modification of the apparatus of the first embodiment of the invention where a liner is mounted on the perforated gas distributing plate to prevent it from being worn. In detail, an exchangeable (detachable) liner 57 is arranged on the perforated gas distributing plate 12 in order to prevent the wear of the plate 12. For example, the liner 57 includes a number of small pieces each having small holes 60 corresponding to numerous nozzles 58 in the plate 12. In assembling, the so-divided liner pieces are respectively fixed to the plate 12 by means of "dish" bolts 62 on condition that the nozzles 58 coincide with the small holes 60 respectively. Reference numeral 64 denotes a separation line for the liner 57.

FIGS. 13 to 16 show the essential part of the apparatus of the first embodiment where a dam is arranged in the vicinity of the perforated gas distributing plate's end on the side of the discharge chute.

Figure 13:
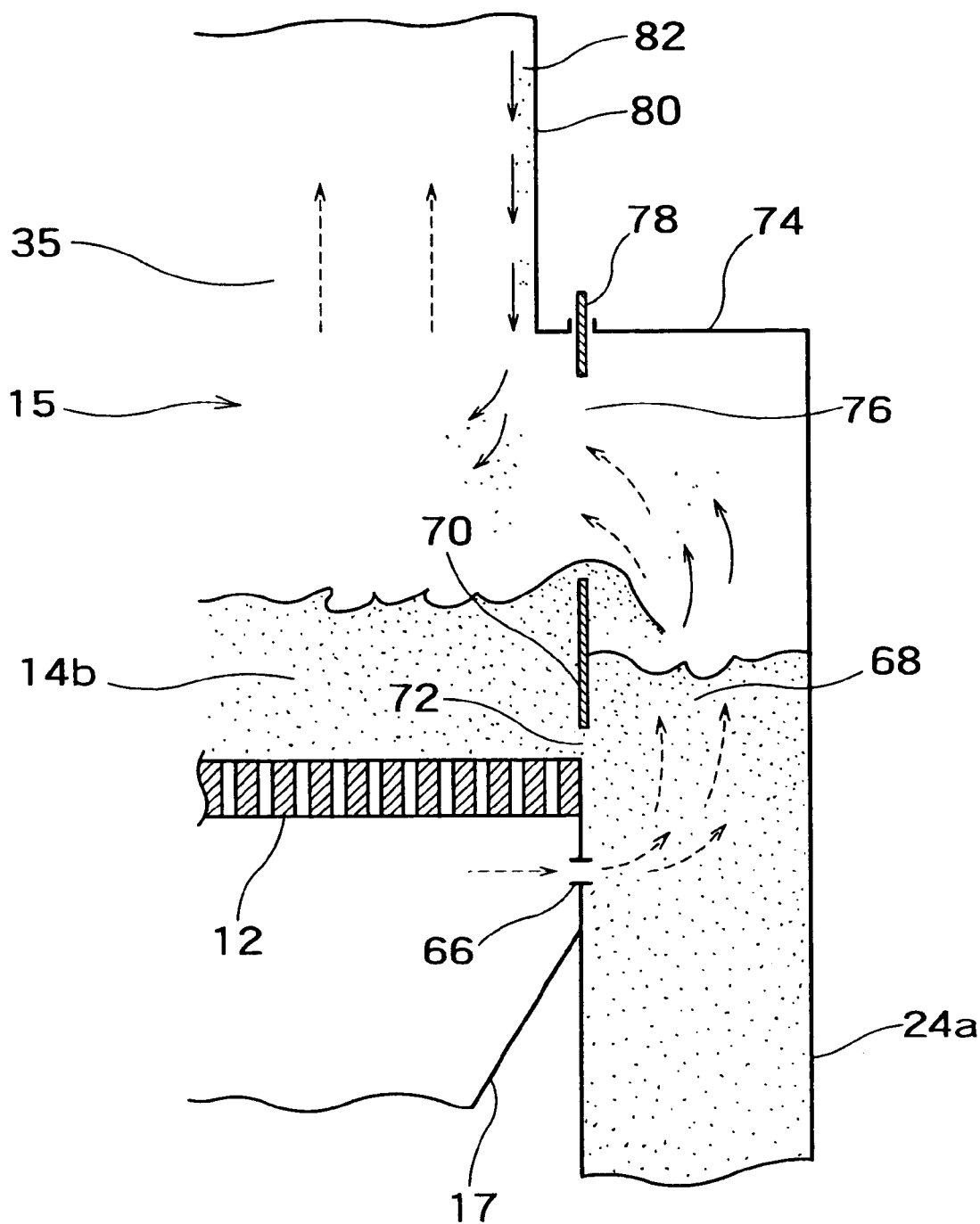
FIG. 13 is an explanatory enlarged sectional view of an essential part of the classifying apparatus of the first embodiment, also showing one example where a dam is arranged near the perforated gas distributing plate's end on the side of an discharge chute.

As shown in FIG. 13, a classification gas introductory nozzle 66 is formed in the sidewall of the "grains" discharge chute 24a so as to open into the wind box 17. Additionally, a "grains" discharge part 68 is provided with a dam 70. The dam 70 is positioned close to one end of the perforated gas distributing plate 12 (i.e. the plate's end on the downstream side in the moving direction of particles). A clearance (slit) 72 is defined between the lower end of the dam 17 and the upper face of the plate 12, for allowing the large lumps or the large-sized particles to pass through the slit.

In order to improve the classification efficiency of the apparatus, a classifying plate 78 is disposed on a ceiling 74 of the classifying chamber 15 on the upside of the exhaust part 68, for reducing the cross-sectional area of a space 70 defined between the dam 70 and the ceiling 74. Both of the dam 70 and the classifying plate 78 are adjustable in respective heights.

Referring to FIG. 1 too, the operation of the particle exhaust device of FIG. 13 will be described below. By spouting the gas through the plate 12, the particles brought into the classifying chamber 15 via the communication passage 19 are fluidized to form the fluidized bed 14b. That is, it is carried out to classify the exhaust gas including the fines and the grains, so that only the gains are withdrawn from the discharge part 68 through the discharge chute 24a, as the products.

For the classification gas, the fluidization gas in the wind box 17 is partially blown into the part 68 through the classification gas introductory nozzle 66. The so-blown gas is ejected from the space 76 above the dam 70 into the free board 35 of the classifying chamber 15 to prevent fine particles 82 falling close to a sidewall 80 from entering into the discharge part 68. Simultaneously, overflowing the dam 70, the particles are dispersed by the blown gas to return the fines to the classifying chamber 15, improving the classification capability.

The height of the dam 70 is adjusted in accordance with the sort of material to be processed. Additionally, the clearance (slit) under the dam 70 is adjusted dependently of the particle size of large lumps or large-sized particles contained in the processed material. Moreover, the height of the classifying plate 78 (or position of the lowermost end) is adjusted so that the resultant longitudinal-sectional area of the space 76 allows the flowing velocity of gas to be optimized. In this example, it is possible to make use of a portion of gas flowing in the wind box, as the gas to be blown into the discharge chute 24a.

Figure 14:
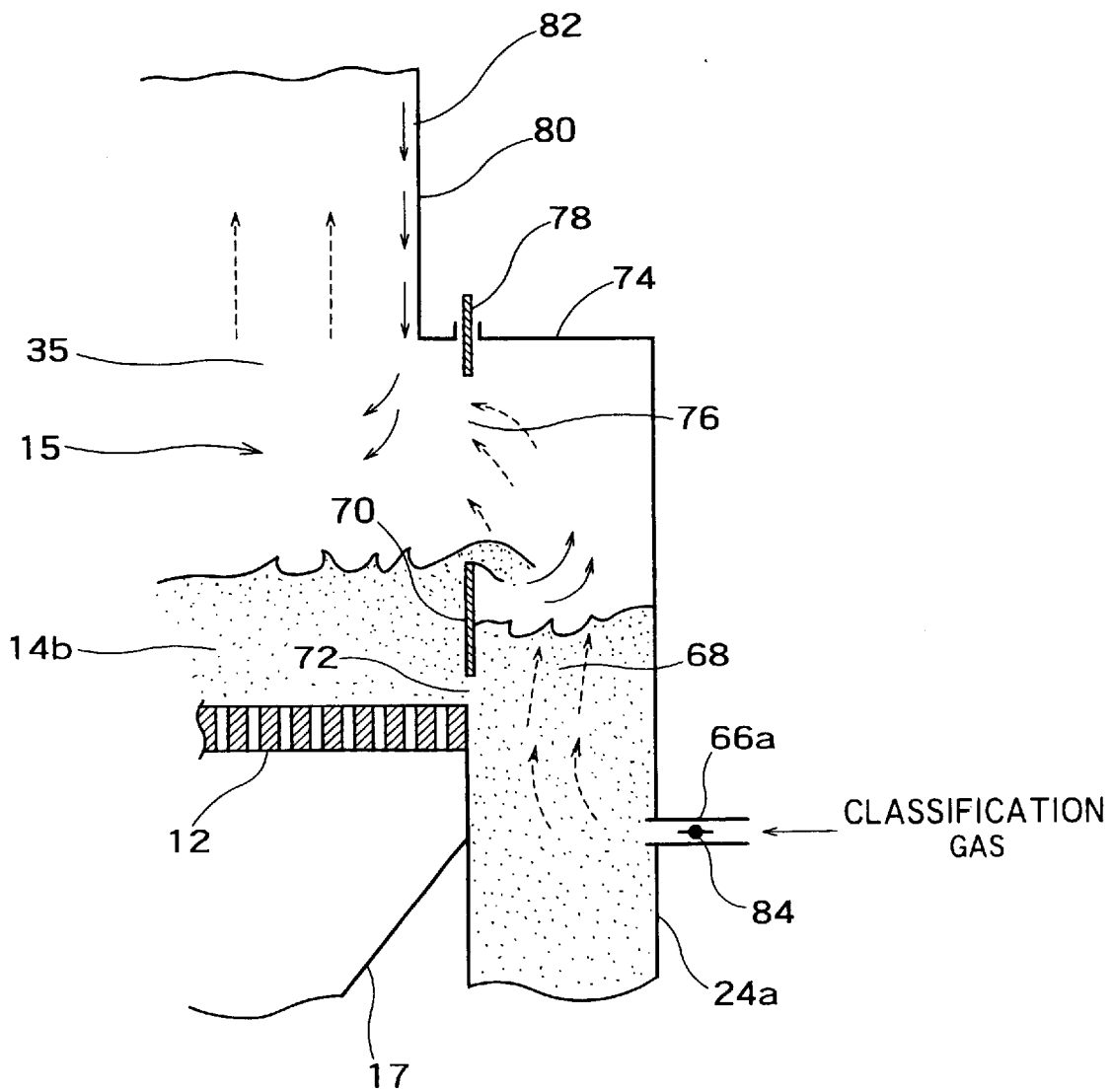
FIG. 14 is an explanatory enlarged sectional view of the essential part of the classifying apparatus of the first embodiment, also showing another example where the dam is arranged near the gas distributing plate's end on the side of the discharge chute.

FIG. 14 shows the modification where a classification gas introductory nozzle 66a in place of the previous nozzle 66 is arranged in the external sidewall of the "grains" discharge chute 24a at a position outside the wind box 17 so as to open into the wind box 17. In this example, both flowing velocity and flowing quantity of the classification gas (e.g. $N_2$ gas, air, combustion exhaust gas, etc.) supplied from the outside of the apparatus can be adjusted by a flow control valve, for example, a damper 84. Thus, it is possible to adjust the classification rate, improving the classification capability.

Other constitution and operation are similar to those of the apparatus of FIG. 13.

Figure 15:
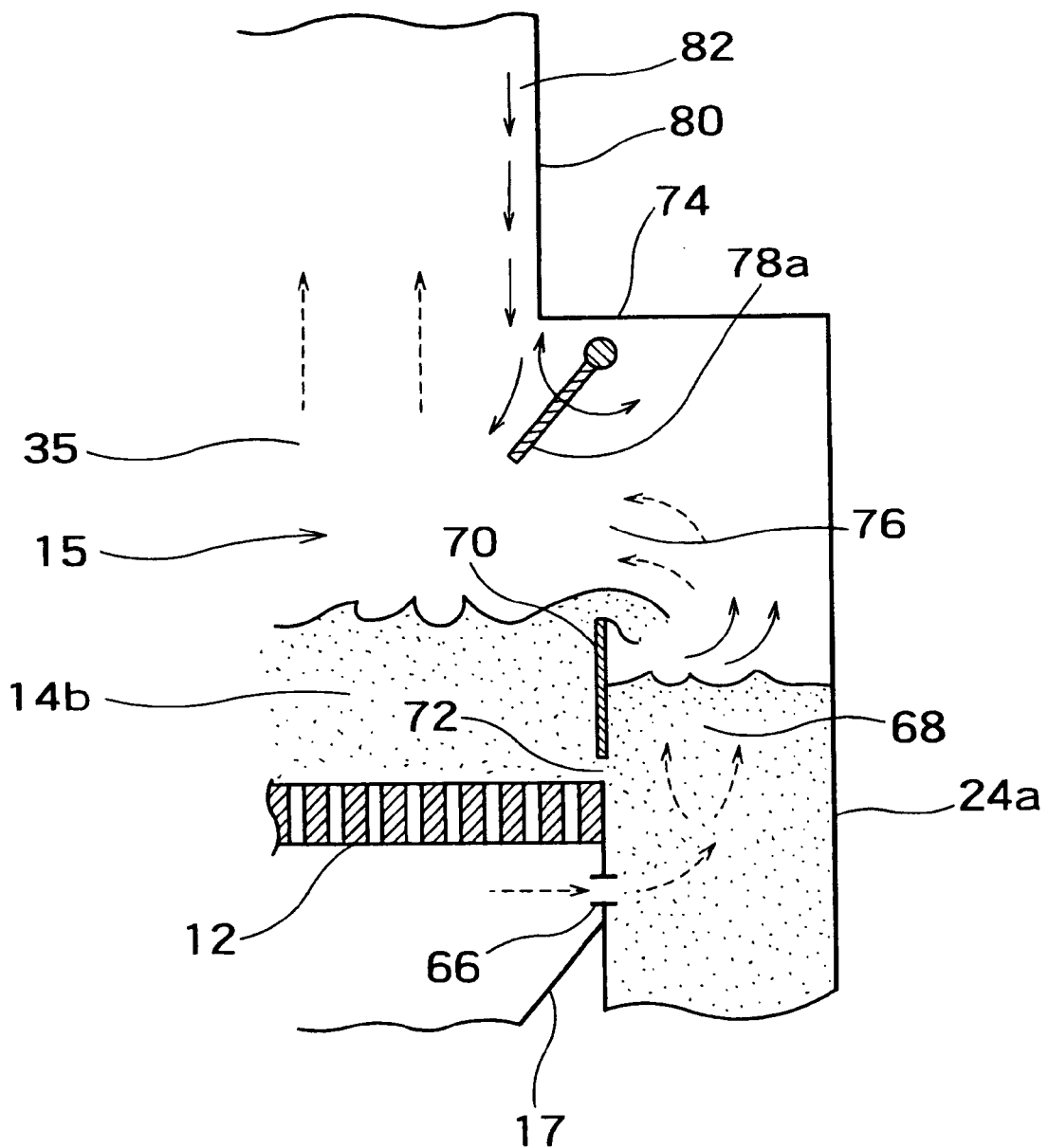
FIG. 15 is an explanatory enlarged sectional view of the essential part of the classifying apparatus of the first embodiment, also showing the other example where the dam is arranged near the gas distributing plate's end on the side of the discharge chute.

FIG. 15 shows a rotatable classifying plate 78a of flap type in place of the previous classifying plate of adjustable height. The classifying plate 78a is capable of adjusting its inclination angle to change the cross-sectional area of the space 76. As shown in the figure, by inclining the plate 78a so that its lower end directs the classifying chamber 15, the falling fine particles 82 can be returned from the plate 78a into the classifying chamber 15. Other constitution and operation of the above-mentioned mechanism are similar to those of the apparatus of FIG. 13.

Figure 16:
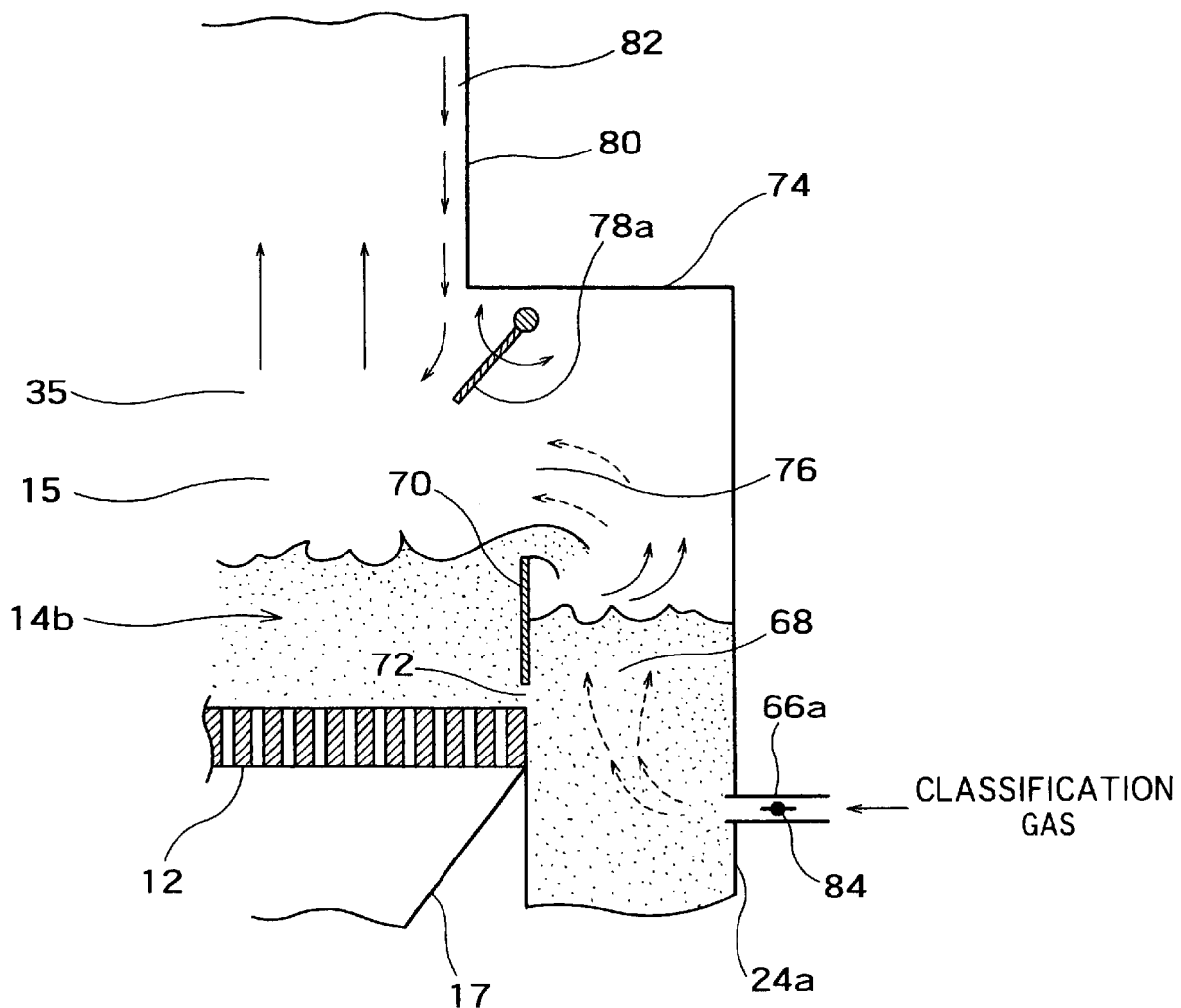
FIG. 16 is an explanatory enlarged sectional view of the essential part of the classifying apparatus of the first embodiment, also showing the further example where the dam is arranged near the gas distributing plate's end on the side of the discharge chute.

FIG. 16 shows the modification where the discharge device is equipped with the classification gas introductory nozzle 66a in the external sidewall of the chute 24a outside the wind box 17 and the rotatable classifying plate 78a in the vicinity of the ceiling 74. Other constitution and operation of the above-mentioned mechanism are similar to those in respective cases of FIGS. 13 to 15.

FIGS. 17 to 20 respectively show essential parts of the modifications where, in common, the large lump discharge chute is arranged on the perforated gas distributing plate's side of the discharge chute in the first embodiment.

Figure 17:
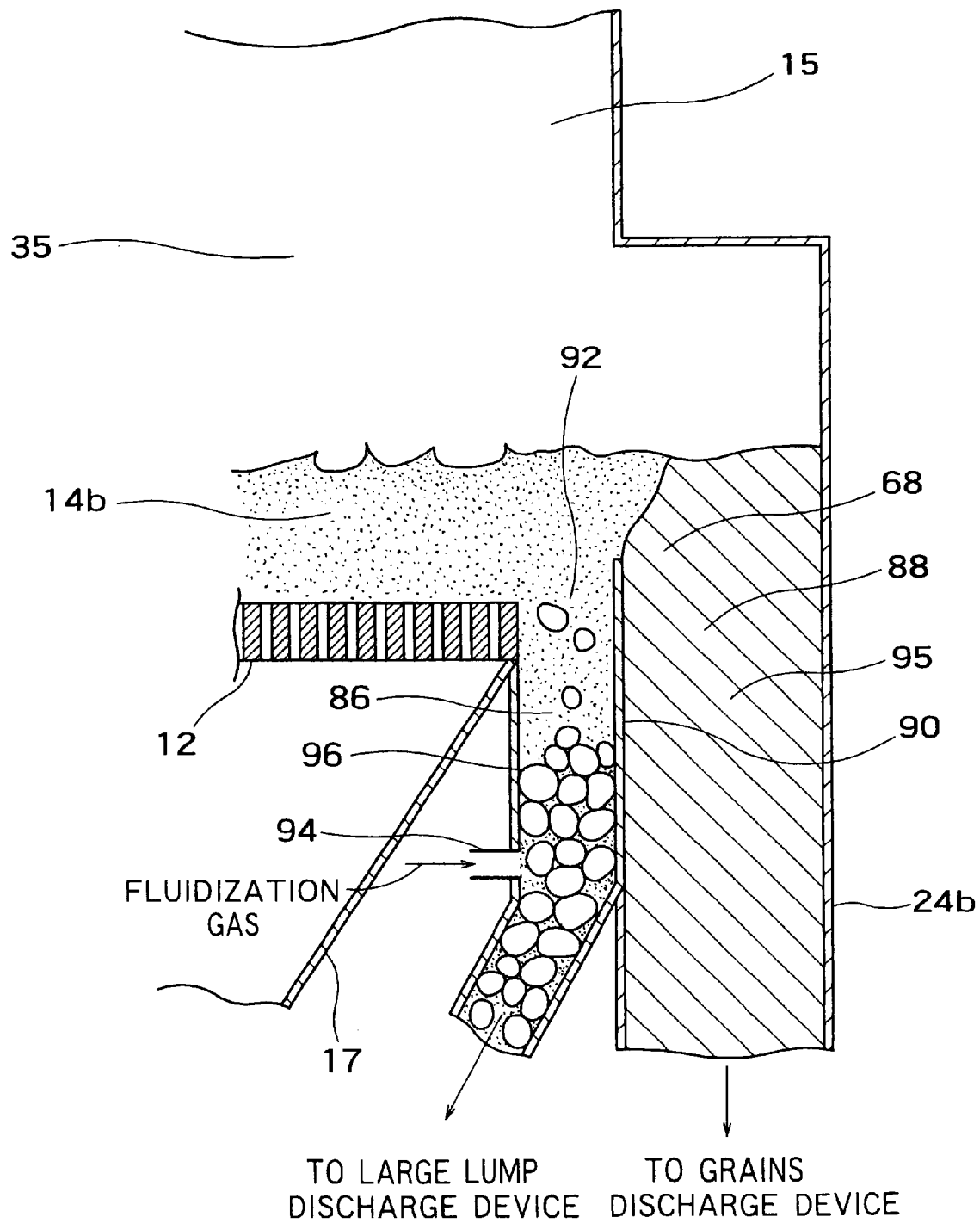
FIG. 17 is an explanatory enlarged sectional view of an essential part of the classifying apparatus of the first embodiment, showing one example where a large lump discharge chute is arranged on the side of the gas distributing plate of the discharge chute.
Figure 18:
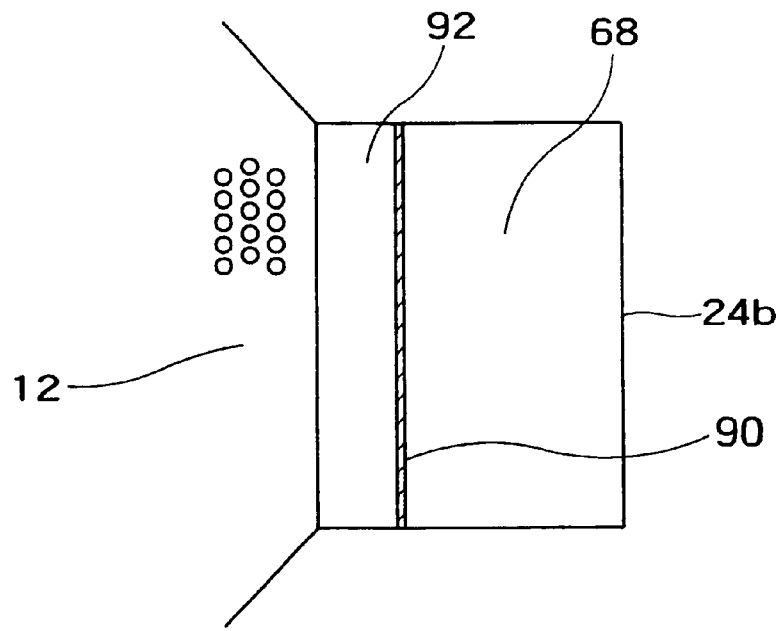
FIG. 18 is an explanatory sectional view about an discharge part of FIG. 17.

As shown in FIGS. 17 and 18, the "grains" discharge chute 24b is divided by a partition plate 90, providing a large lump discharge chute 86 on the side of the perforated gas distributing plate 12 and a particle distribute chute 88 on the side of the distal end of the classifying chamber 15. That is, the partition plate 90 is arranged so as to extend up to the discharge lowermost end of the discharge chute. Reference numeral 92 designates a large lump discharge part (discharge port). A fluidization gas blowing nozzle 94 is provided on the lateral side of the large lump discharge chute 86.

The large lump discharge chute 86 is connected to a large lump discharge device (not shown), while the grains discharge chute 88 is connected to a grains discharge device (not shown).

Referring to FIG. 1 also, the operation of the grains discharge devices of FIGS. 17 and 18 will be described below. By spouting the gas through the gas distributing plate 12, the particles brought into the classifying chamber 15 via the communication passage 19 are fluidized to form the fluidized bed 14b. Consequently, the material is classified into the exhaust gas including the fines and the grains and thereafter, the gains are withdrawn from the "grains" discharge part 68 through the grains discharge chute 88, as the products. Reference numeral 95 denotes a moving layer consisting of the grains.

The fluidization gas is blown into the large lump discharge chute 86 through the blowing nozzle 94 thereby to fluidize the particles above the chute 86 and drop the large lumps 96 into the chute 86. For the fluidization gas, there may be employed one of inert gases, for example, cooled air, heated air, combustion exhaust gas, $N_2$-gas, etc. This fluidization gas is blown into the chute 86 through the blowing nozzle 94 so that the flowing velocity of the fluidization gas above the large lump discharge chute 86 is one to three (1–3) times, desirably, one-and-a-half to two (1.5–2) times as much as the minimum fluidization velocity Umf at the fluidized bed 14b.

Figure 19:
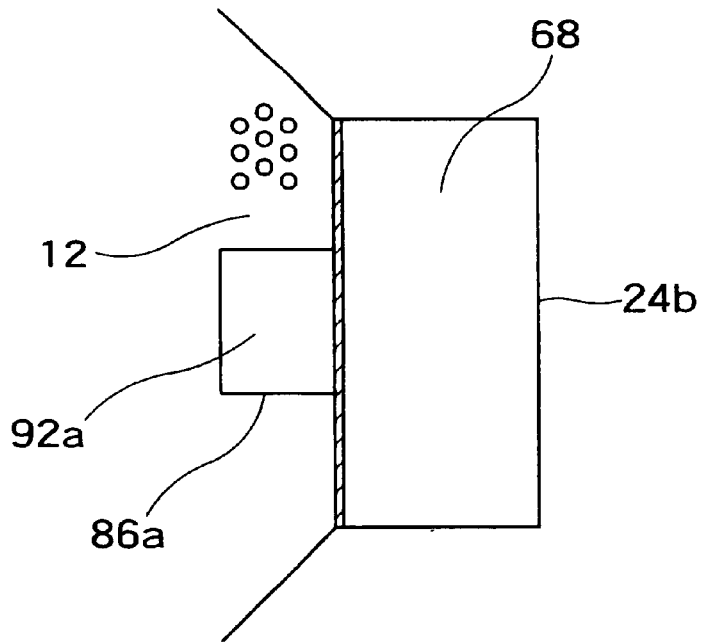
FIG. 19 is an explanatory sectional view about the discharge part in another arrangement of the large lump discharge chute of FIG. 17.

FIG. 19 shows the discharge structure where the discharge chute 24b is not divided by the partition plate but the discharge part 68 is provided, on the side of the distributing plate 12, with a large lump discharge chute (large lump discharge port) 92a to which a large lump discharge chute 86a is connected. The other constitution and operation of this structure are similar to those of the discharge structures of FIGS. 17 and 18.

Figure 20:
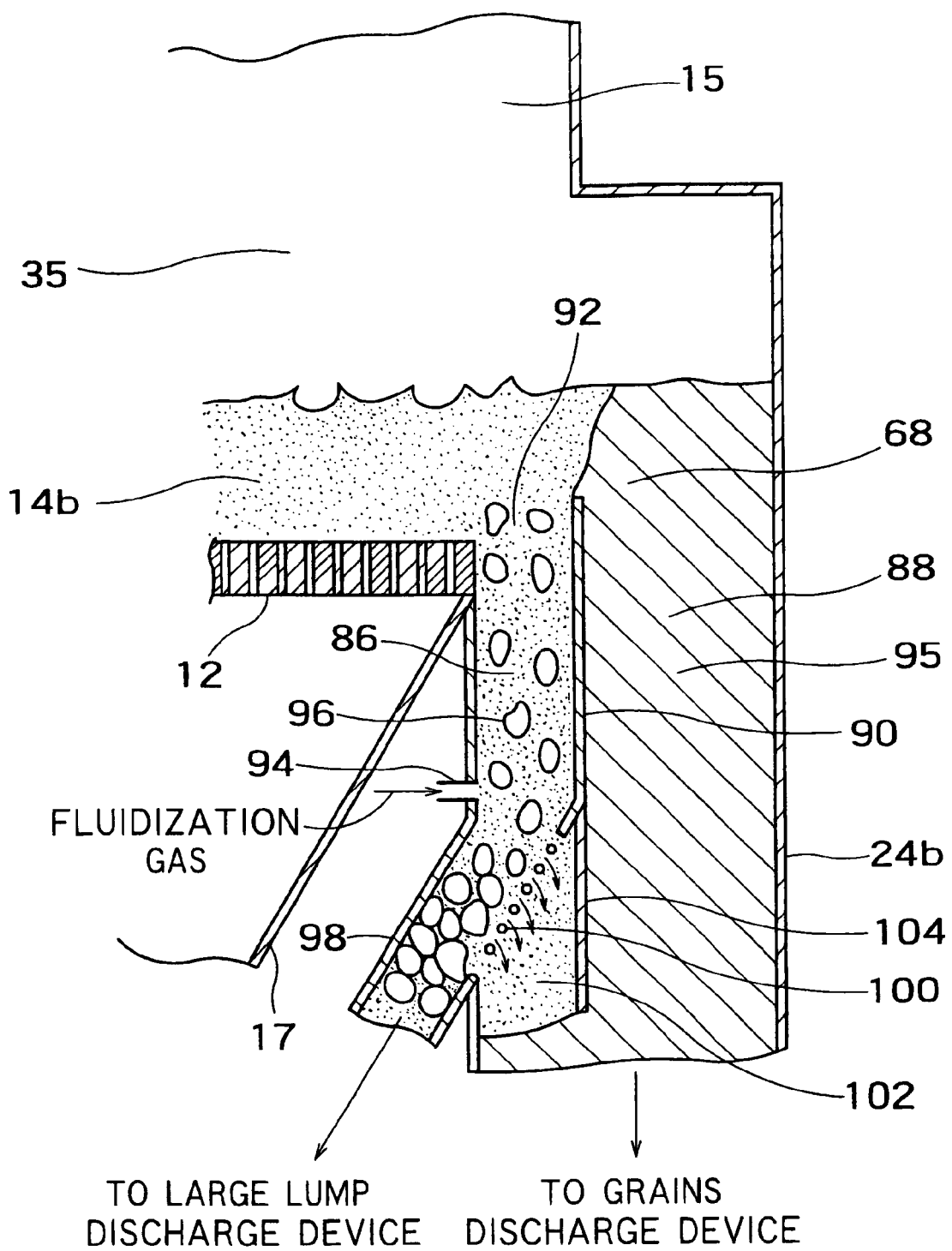
FIG. 20 is an explanatory enlarged sectional view of the essential part of the classifying apparatus of the first embodiment, also showing another example where the large lump discharge chute is arranged on the side of the gas distributing plate of the discharge chute.

FIG. 20 shows the discharge structure where the lower part of the large lump discharge chute 86, for example, the chute's part beneath the fluidization gas blowing nozzle 94 is inclined to provide a slanted part 98. In the slanted part 98, a partition wall on the side of the grains discharge chute partially or wholly provided with a sieve structure 100. In the discharge chute 24b, a partition wall 104 is provided to form a space 102 below the sieve structure 100. Consequently, the small-sized particles diving into the large lump discharge chute 86 are classified by the sieve structure 100 and finally, the particles are returned to the processed-material exhaust chute 24b, in detail, the particle exhaust chute 88. For the sieve structure 100, there may be adopted a sieve structure having numerous grizzly bars, a sieve structure having a wire-netting, etc. According to this arrangement, it is possible to discharge only the large lumps selectively. The other constitution and operation of this structure are similar to those of the discharge structures of FIGS. 17 and 18.

Figure 21:
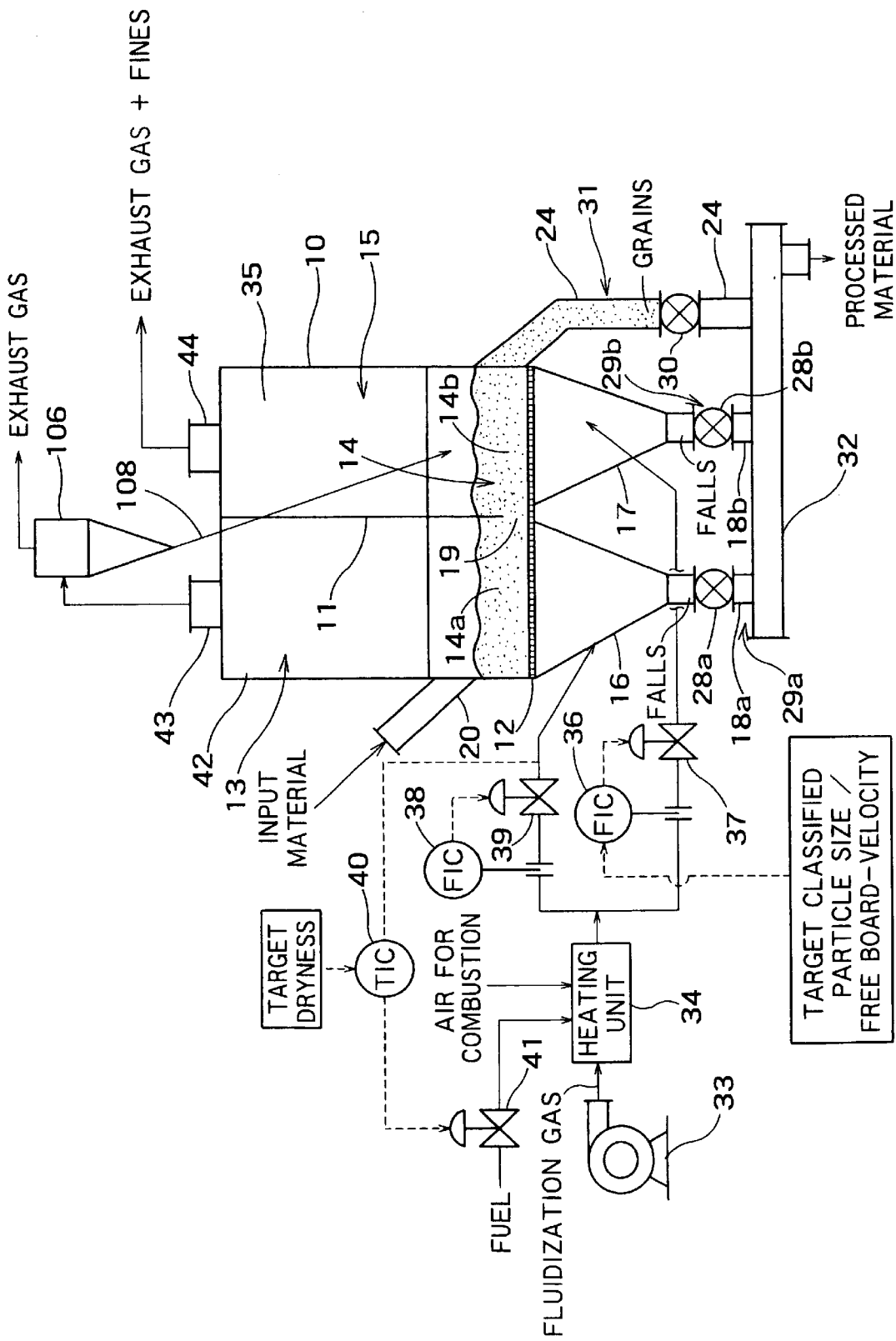
FIG. 21 is a schematically systematic diagram showing the constitution of the multi-chamber fluidized bed classifying apparatus (in case of the drying chamber and the classifying chamber) of the first embodiment, also showing another example.

FIG. 21 shows another example of the multi-chamber fluidized bed classifying apparatus of the first embodiment.

In FIG. 21, the powder and granular material forming the fluidized bed 14a in the drying chamber 13 contains fines (powder) whose particle size is smaller than a classified particle size corresponding to the flow rate of the fluidization gas blown into the drying chamber 13, namely, the flowing velocity in the free board 42. The fines are scattered from the bed 14a into the free board 42 and discharged from the gas exhaust port 43 together with the exhaust gas. The exhaust gas containing the fines discharged from the gas exhaust port 43 are introduced into a cyclone 106 to trap the fines. The so-trapped fines are discharged from the lowermost part of the cyclone 106 and returned to the classifying chamber 15 through a fine extracting tube 108. Note, the cyclone 106 may be replaced by other solid/gas separating units, such as a bag filter, in the modification.

Generally, the drying chamber 13 has a small quantity of scattering fines because of high moisture content of the material introduced into the chamber. In addition, the quantity of scattering fines becomes to be small when there is established a small flow rate of the fluidization gas to be blown into the classifying chamber 15 upon the establishment of small classified particle size, a large material input or a large moisture content in material. Further, even if the flow rate of fluidization gas blown into the drying chamber 13 becomes excessively thereby causing the quantity of scattering fines to be increased, the classifying capability of the apparatus is not influenced because of its structure where the scattering fines are trapped by the cyclone 106 and returned to the classifying chamber 15.

Although it is not shown in the figure, the exhaust gas with the fines discharged from the gas exhaust port 44 of the classifying chamber 15 is introduced into a solid/gas separator (e.g. cyclone or/and bag filter, etc.) in which the fines are trapped and separated from the exhaust gas (in the apparatus of FIG. 1, as well).

The other constitution and operation of the modification are similar to those of the apparatus of FIG. 1. Note, it is a matter of course that the apparatus of FIG. 21 is capable of employing the constitutions shown in FIGS. 2 to 20.

Figure 22:
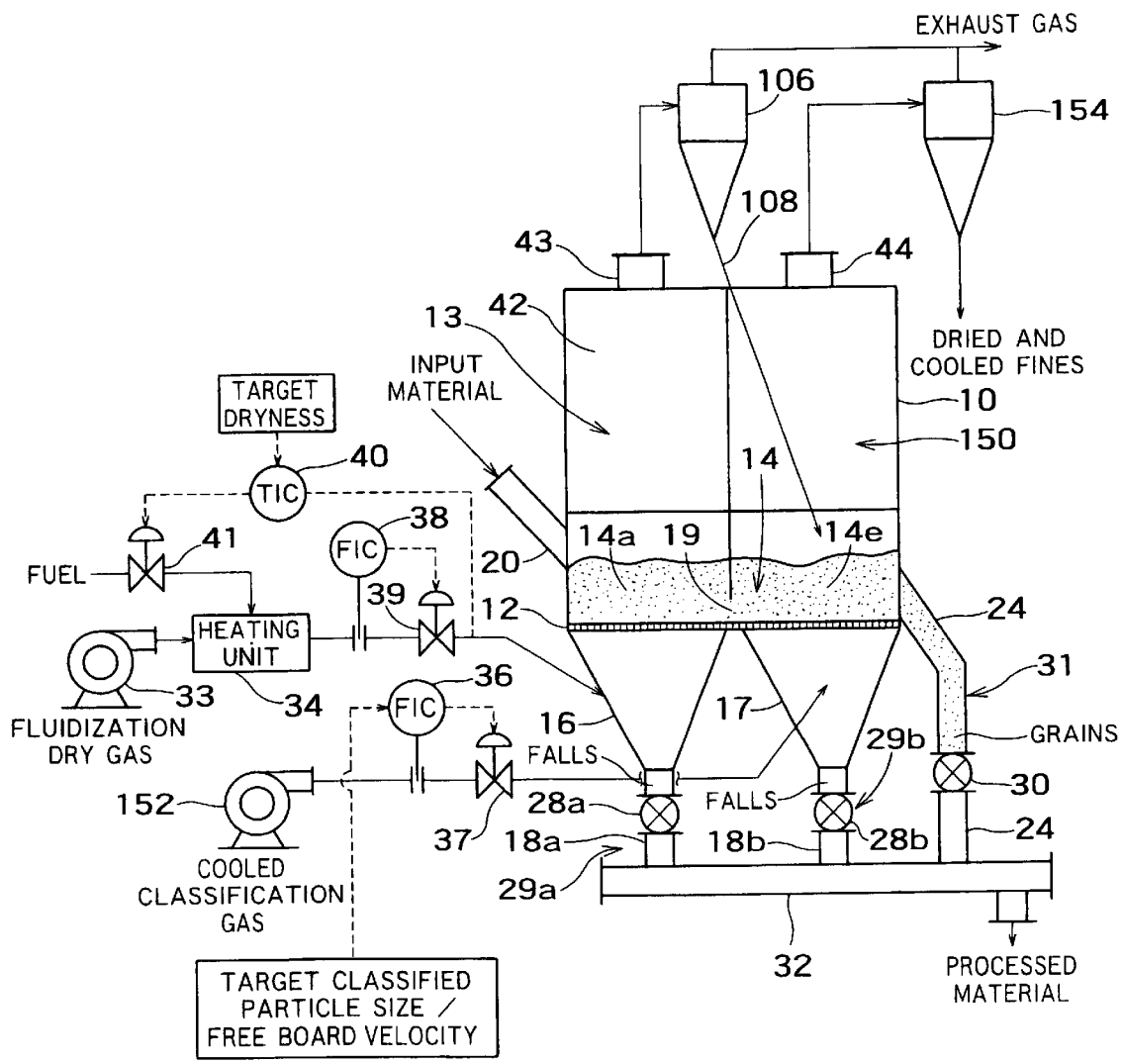
FIG. 22 is a schematically systematic diagram showing the modification of the multi-chamber fluidized bed classifying apparatus of FIG. 21.

FIG. 22 shows the modification of the multi-chamber fluidized bed classifying apparatus of FIG. 21.

This multi-chamber fluidized bed classifying apparatus includes a cooled classifying chamber 150 in place of the classifying chamber 15. Air for cooled classification by an air fan 152 is fed to the wind box 17 on the underside of the cooled classifying chamber 150. The flow control valve 37 is interposed in a pipe connecting the air fan 152 with the wind box, which is similar to FIG. 21. The flow indicating controller (FIC) 36 is also connected with the flow control valve 37. Upon establishing either designated target particle size or flowing velocity in the free board on the flow indicating controller 36, it is executed to control the flow rate of the fluidization gas blown into the cooled classifying chamber 150, forming the proper fluidized bed therein.

A cyclone 154 is communicated with the gas exhaust port 44 to separate the fines from the exhaust gas discharged from the chamber 150.

In this way, since the "cooled classification" air supply system is communicated with the chamber 150 to blow the cooled air thereinto in the apparatus, the cooling and classifying operations for the material are together performed in the cooled classifying chamber 150, simultaneously. That is, not that the dried material is discharged at high temperature causing the moisture to be evaporated easily, but that the dried material can be discharged while being cooled. Therefore, it is possible to prevent the occurrence of dust in the later process, which would be caused by the evaporation of residual moisture in the dried material if it were discharged at high temperature. In addition to the easy-handling for the dried material, the apparatus is also capable of preventing the working environment from being deteriorated and furthermore, it is possible to prevent the occurrence of machine troubles derived from the adhesion of dusts. Since the cooling operation can be accomplished without providing a special cooling chamber, the apparatus can be small-sized and provided with low cost.

Repeatedly, the cyclone 154 allows the dried/cooled fines to be withdrawn from the mixture of exhaust gas and fines discharged from the cooled classifying chamber 150, which means that the so-collected fines can be processed independently of the grains from the cooled classifying chamber 150. Consequently, the above arrangement allows the latter handling to be facilitated.

Figure 23:
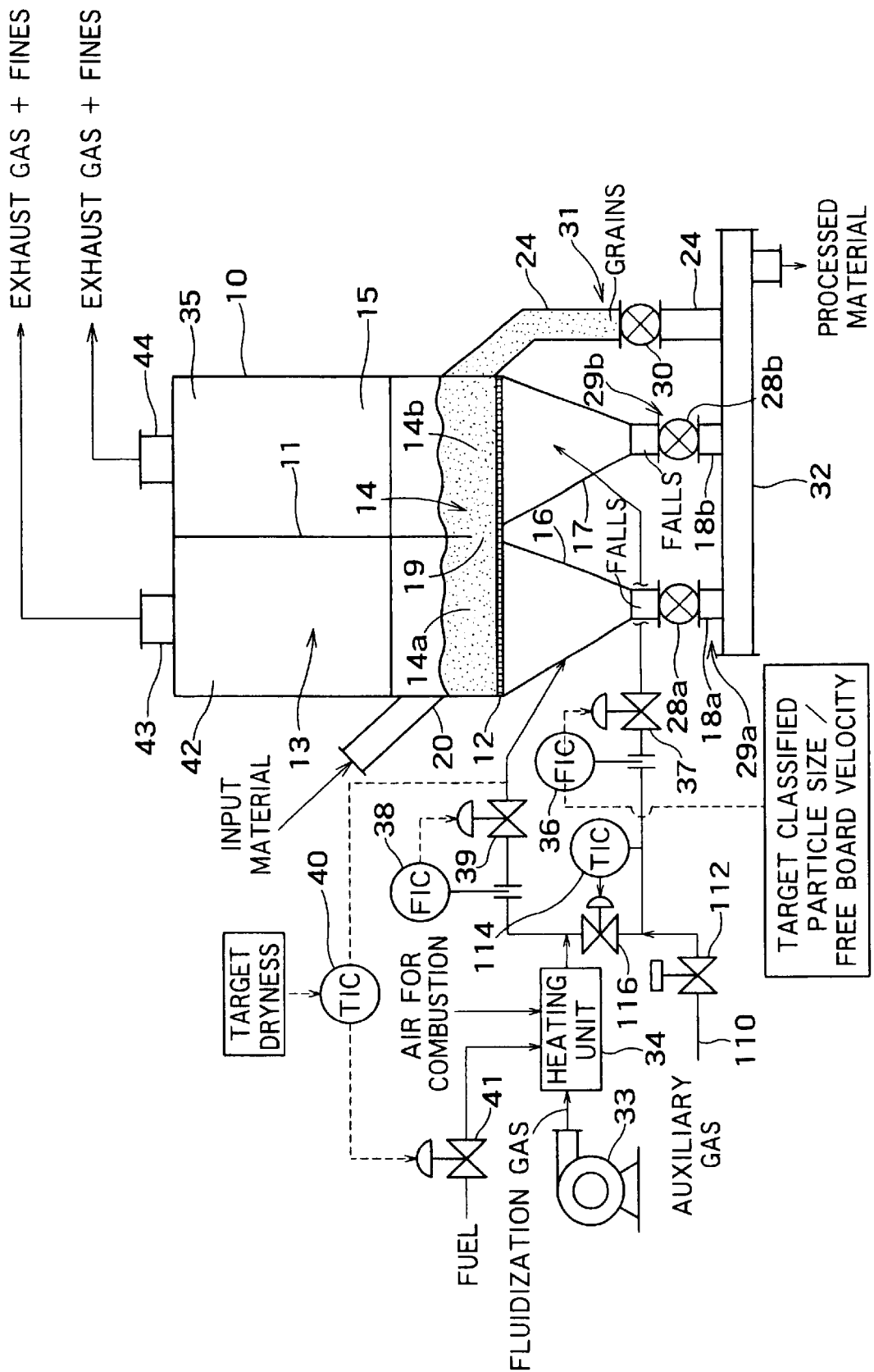
FIG. 23 is a schematically systematic diagram showing the constitution of the multi-chamber fluidized bed classifying apparatus (in case of the drying chamber and the classifying chamber) of the first embodiment, also showing the other example.

FIG. 23 shows a further modification of the multi-chamber fluidized bed classifying apparatus of the first embodiment.

As shown in FIG. 23, the hot wind of high temperature from the heating unit 34 is mixed with the auxiliary gas of low temperature fed through an auxiliary gas supply tube 110, so that the hot wind of about 250 to 400° C. as an example is supplied to the wind boxes 16, 17. Reference numeral 112 denotes a flow control valve for the auxiliary gas. For the auxiliary gas, for example, a fresh air, an exhaust gas after the drying/classifying process, etc. may be employed. Note, in case of using the exhaust gas, the apparatus could be operated in safety because of low concentration of oxygen in the exhaust gas, even if executing the refining for coals, for example.

Concretely, there is established a quantity of gas to be blown into the classifying chamber 15, which can accomplish the target classified particle size. Upon this establishment, the operations of a calculating unit (not shown), the flow indication controller (FIC) 36 and the flow control valve 37 are respectively controlled so that the gas quantity of the fluidization gas supplied to the wind box 17 allows the formation of an appropriate fluidized bed in the classifying chamber 15 and realizes the above-established gas quantity. Then, upon the establishment in temperature of the hot wind to be blown into the classifying chamber 15, it is carried out to control the pick-up amount of hot gas from the heating unit 34 by a temperature indicating controller (TIC) 114 and a flow control valve 116.

Similarly, upon the establishment of the blowing gas quantity be supplied into the drying chamber 13, which allows the formation of an appropriate fluidized bed, the flow indication controller (FIC) 38 and the flow control valve 39 are respectively controlled so that the gas quantity maintains at the above-established gas quantity constantly. When the appropriate fluidized bed cannot be maintained by only the hot gas supplied from the heating unit 34 in relation to the hot gas temperature for achievement of the target dryness, the above-mentioned auxiliary gas is introduced to ensure the quantity of blowing gas capable of maintaining the proper fluidized bed in the drying chamber 13. The control method for accomplishing the target dryness is similar to that in case of FIG. 1.

In this way, for example, even when the classified particle size is large and therefore, the quantity of gas blown into the classifying chamber 15; the target dryness is small due to smallness in water content of the raw material; or when the proper fluidized bed cannot be maintained in the drying chamber 13, the gas quantity to be blown into the drying chamber 13 or the classifying chamber 15 can be ensured by introducing the auxiliary gas of low temperature. Additionally, by controlling the pick-up amount of hot gas from the heating unit 34 upon the establishment in temperature of the hot gas to be blown into the classifying chamber 15, it is possible to adjust the charged amount of the auxiliary gas and also adjust the quantity of gas to be blown into the classifying chamber 15, improving the classification capability furthermore.

The other constitution and operation of the modification are similar to those of the apparatus of FIG. 1. Note, it is a matter of course that the apparatus of FIG. 23 is capable of employing the constitutions shown in FIGS. 2 to 21.

Figure 24:
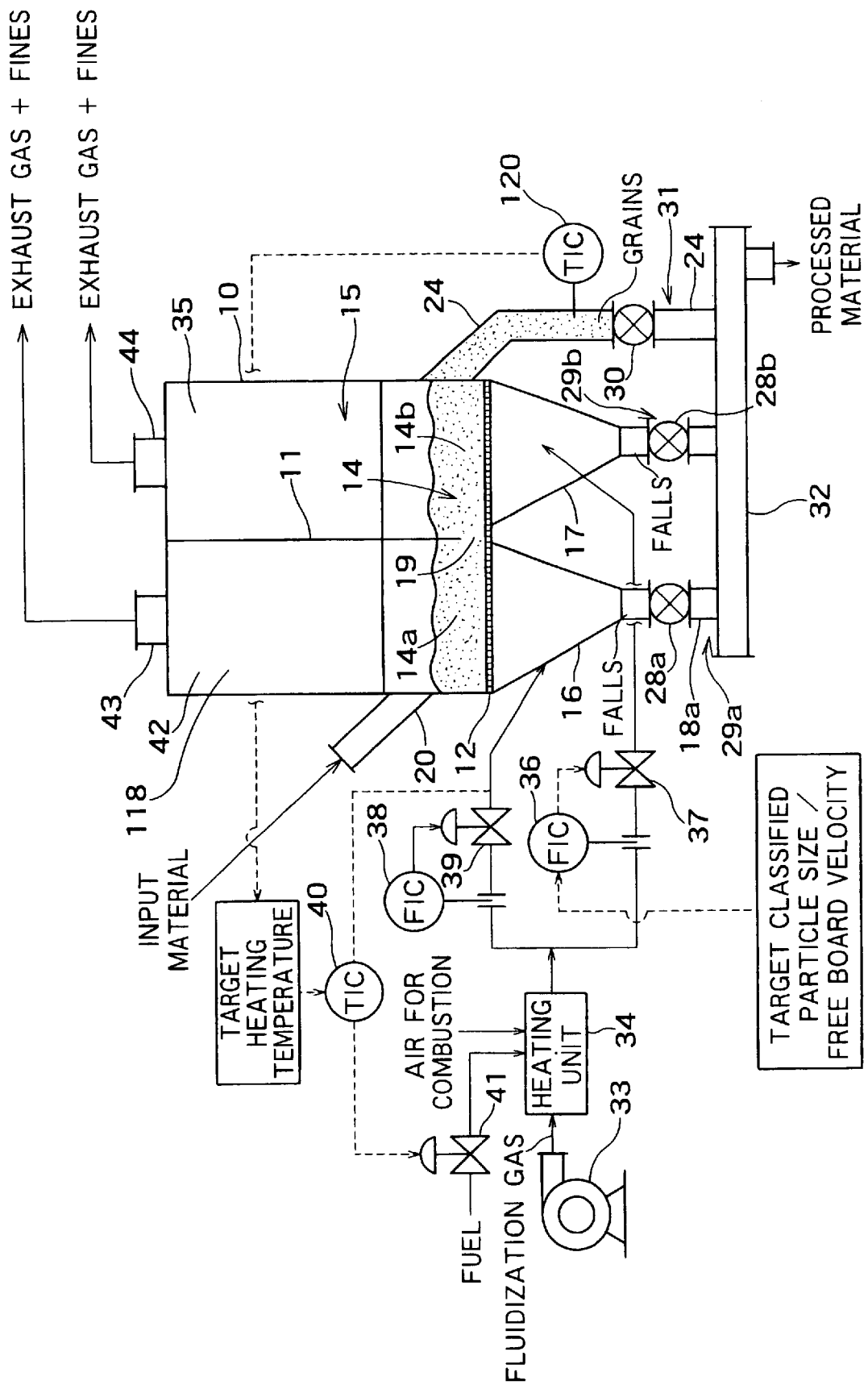
FIG. 24 is a schematically systematic diagram showing the constitution of the multi-chamber fluidized bed classifying apparatus (in case of the drying chamber and the classifying chamber) of the second embodiment of the invention.

FIG. 24 shows the multi-chamber fluidized bed classifying apparatus in accordance with the second embodiment of the invention. According to the embodiment, as an example, the chamber including the fluidized bed is partitioned into two chambers, providing a heating chamber on the upstream side and the classifying chamber on the downstream side.

In FIG. 24, the temperature of processed material at the exist of fluidized bed, in detail, the temperature of processed material in the grains discharge chute 24 is firstly detected to establish the temperature of heated wind to be blown into the heating chamber 118, by a temperature indicating controller (TIC) 120. Then, if there is a difference between the detected temperature and the target temperature, the above-established temperature of heated gas is altered and thereupon, the calculating unit (not shown), the temperature indicating controller (TIC) 40 and the fuel control valve 41 are controlled so that the temperature of the fluidization gas supplied into the wind box 16 reaches the above-established temperature.

The other constitution and operation are similar to those of the first embodiment. Note, of course, it is possible for the apparatus of FIG. 24 to employ the constitutions shown in FIGS. 2 to 20. The third embodiment is similar to the first embodiment with respect to the adoption of structure (see FIG. 21) where the cyclone is arranged at the exit of the heating chamber 118 and the adoption of structure (see FIG. 23) to introduce the auxiliary gas into the classifying chamber 15 and/or the cooling chamber 122 as occasion demands.

Figure 25:
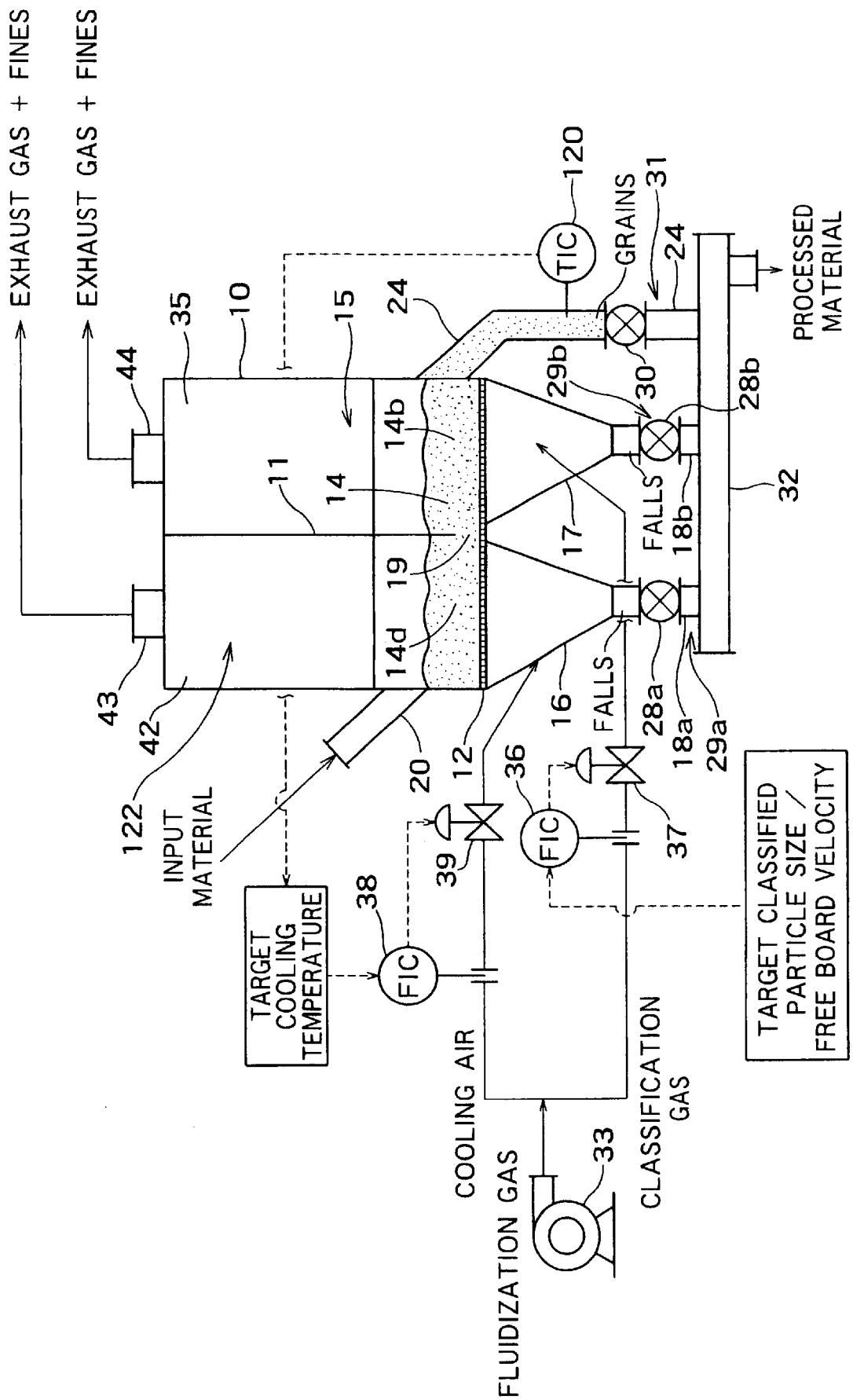
FIG. 25 is a schematically systematic diagram showing the constitution of the multi-chamber fluidized bed classifying apparatus (in case of the drying chamber and the classifying chamber) of the third embodiment of the invention.

FIG. 25 shows the multi-chamber fluidized bed classifying apparatus in accordance with the third embodiment of the invention. According to the embodiment, as an example, the chamber including the fluidized bed is partitioned into two chambers, providing a cooling chamber on the upstream side and the classifying chamber on the downstream side.

Also in FIG. 25, the temperature of grains at the exist of fluidized bed, in detail, the temperature of grains in the grains discharge chute 24 is firstly detected to establish the temperature of air to be blown into the cooling chamber 122, by the temperature indicating controller (TIC) 120. Then, if there is a difference between the detected temperature and the target cooling temperature, the above-established temperature of blown air is altered and thereupon, the calculating unit (not shown), the temperature indicating controller (TIC) 38 and the fuel control valve 39 are controlled so that the temperature of the fluidization gas supplied into the wind box 16 reaches the above-established temperature.

Although the present embodiment does not require a heater etc. because of the blowing of cooling air in place of heated gas, the basic control method of the embodiment is similar to that in case of drying or heating the material. Note, when introducing an auxiliary gas of lower temperature into the fluidization gas, it is necessary to control both temperature and flow of the air to be blown into the cooling chamber 122. Nevertheless, if it is economically difficult to introduce the auxiliary gas of lower temperature, then it is executed to establish a minimum value about the quantity of cooling air instead of the control of cooling temperature.

The other constitution and operation are similar to those of the first embodiment. Note, of course, it is possible for the apparatus of FIG. 25 to employ the constitutions shown in FIGS. 2 to 20. The third embodiment is similar to the first embodiment with respect to the adoption of structure (see FIG. 21) where the cyclone is arranged at the exit of the cooling chamber 122 and the adoption of structure (see FIG. 23) to introduce the auxiliary gas into the classifying chamber 15 and/or the cooling chamber 122 as occasion demands.

In conclusion, owing to the above-mentioned structure, the present invention can take the following effects.

(1) Owing to the possibility to independently adjust the gas quantity of the fluidization gas so as to realize the desired particle size in the classifying chamber on the lowermost stream side, it is possible to maintain the fine and stable fluidized bed even in the upstream processing chamber without exerting an influence on the classifying capability and possible to adjust the gas quantity and/or the gas temperature required for the processes of drying, heating, cooling, etc.

(2) Owing to the adoption of the perforated gas distributing plate, neither immovable part of particles nor stagnation of grains is produced to maintain the fine and stable fluidized bed. Since the perforated gas distributing plate has a simple structure, the apparatus can be low-priced while less causing the plate to be worn and blocked, facilitating the maintenance of the apparatus. Further, the transportation of grains does not require elevating the spouting speed, reducing the pressure loss. The flowing speed of fluidized bed may be set to a small value, so that the scattering of fines is small.

(3) The perforated gas distributing plate is capable of forming the uniform fluidized bed and the structure of the perforated gas distributing plate is simple and low-priced in production. When the detachable liner is attached to the perforated gas distributing plate for its anti-wear measures, the maintenance can be facilitated greatly.

(4) Since the wind boxes are in the form of "hoppers" and the falls into the wind boxes are discharged by the "falls" discharge devices continuously, there is no possibility of falls being stacked in the boxes, providing a safety and a stable fluidized bed.

(5) If the fines contained in the exhaust gas from the processing (drying, heating, cooling, etc.) chamber are collected by the solid/gas separator, such as the cyclone, and subsequently loaded into the classifying chamber, then the classifying capability can be improved. Thus, even if the scattering of fines in the processing chamber is large, then the classifying capability is not influenced.

(6) In case of high content of coarse particles and large lumps, the large lump discharge device is provided just below the material supply chute and environs, for partially discharging the coarse particles etc. Consequently, the whole quantity of particles can be fluidized thereby to always maintain the stable operation of the apparatus.

(7) In the arrangement allowing the particles to overflow the dam at the end of the perforated gas distributing plate thereby discharging the particles into the "grains" discharge chute to which the classified gas is introduced, it is possible to remarkably decrease the possibility of mixing the fines into the grains for the improvement of classifying capability since the fines are blown back into the main body by the classifying gas blown into the "grains" discharge chute.

(8) In the structure where the classifying plate is arranged above the dam and height of the dam and/or height or angle of the classifying plate can be adjusted, it is possible to change the cross-sectional area of a space between the classifying plate and the dam. Thug, it is possible to change the classified amount of particles with the change of gas velocity flowing from the grains discharge chute into the main body, improving the classifying capability furthermore.

(9) In the arrangement of the large lump discharge chute on the discharging side of the processed material, it is possible to prevent the clusters from being mixed with the grains as the processed material certainly. Comparing with the conventional structure where the large lumps are discharged through the chute penetrating the gas distributing plate and the wind box, the present of the apparatus can be simplified in structure. The large lump discharge chute does not penetrate the wind box. Therefore, even when using the high temperature gas as the processing gas, the safe operation can be ensured since the chute is not exposed to the high temperature gas for a long time.

(10) Since the large lumps charged into the fluidized bed are finally gathered to the vicinity of the discharge end, it is possible to perform the discharging of the large lumps effectively.

(11) In the arrangement of the sieve structure, such as grizzly, mesh, etc., on the lower part of the large lump discharge chute, it is possible to discharge only the large lumps selectively with the return of normal particles (grains), which have entered into the large lump discharge chute together with the large lumps, to the grains discharge chute thereby to reduce the quantity of processed material being mixed with the large lumps.

What is claimed is:

1. A multi-chamber fluidized bed classifying apparatus which applies at least one of drying, heating and cooling on powder and granular material and which includes a fluidized bed for classifying the powder and granular material into fines and grains, comprising:

a main body for processing the powder and granular material therein, the main body being provided, on a lower part thereof, with a lower opening;

a perforated gas distributing plate having a number of nozzles to cover the lower opening of the main body;

a vertical partition plate for dividing the interior of the main body into at least one processing chamber arranged on the upstream side of the main body to perform at least one of drying, heating and cooling processes and a classifying chamber arranged on the downstream side of the main body to perform a classifying process;

a communication passage defined under the partition plate to communicate the processing chamber with the classifying chamber;

a hopper-shaped wind box on the processing chamber's side, arranged under the perforated gas distributing plate on the underside of the processing chamber;

an discharge unit on the processing chamber's side, arranged on the lowermost end of the wind box on the processing chamber's side, for discharging falls falling into the wind box;

a processing fluidization-gas supply system connected to the wind box on the processing chamber's side, for supplying fluidization gas used for at least one of drying, heating and cooling processes into the wind box;

control means arranged in the processing fluidization-gas supply system, for controlling at least one of quantity and temperature of the fluidization gas supplied into the wind box on the processing chamber's side;

a hopper-shaped wind box on the classifying chamber's side, arranged under the perforated gas distributing plate on the underside of the classifying chamber;

an exhaust unit on the classifying chamber's side, arranged on the lowermost end of the wind box on the classifying chamber's side, for discharging falls falling into the wind box;

a classifying fluidization-gas supply system connected to the wind box on the classifying chamber's side, for supplying fluidization gas used as classifying gas into the wind box;

flow control means arranged in the classifying fluidization-gas supply system, for controlling a quantity of the fluidization gas supplied into the wind box on the classifying chamber's side;

a material supply chute connected to an end of the processing chamber on the uppermost stream side, for supplying the powder and granular material into the main body;

a grains discharge chute connected to another end of the classifying chamber on the lowermost stream side, for discharging the processed coarse brain from the main body; and gas exhaust ports arranged on the processing and classifying chambers, for spouting exhaust gas containing the fines;

wherein the powder and granular material supplied through the material supply chute is fluidized in the processing chamber by the processing gas thereby to perform at least one of drying, heating and cooling processes and subsequently, the powder and granular material is transferred through the communication passage into the classifying chamber to classify the material in the classifying chamber and the so-classified coarse powder is discharged out of the main body through the grains discharge chute.

2. A multi-chamber fluidized bed classifying apparatus as claimed in claim 1, wherein the communication passage has its variable opening area.

3. A multi-chamber fluidized bed classifying apparatus as claimed in claim 1, wherein
the communication passage includes by a gate capable of vertical movement.

4. A multi-chamber fluidized bed classifying apparatus as claimed in claim 1, wherein
the communication passage is defined by a number of horizontal or inclined short pipes.

5. A multi-chamber fluidized bed classifying apparatus as claimed in claim 1, wherein
the communication passage includes a rotatable plate body.

6. A multi-chamber fluidized bed classifying apparatus as claimed in claim 1, wherein the gas exhaust port of at least one processing chamber is connected to a solid/gas separator which has its lower part connected to the classifying chamber through a powder extraction pipe.

7. A multi-chamber fluidized bed classifying apparatus as claimed in claim 1, further comprising a large lump discharge device for discharging coarse particles more than a particle size whose fluidized bed superficial velocity is equal to a minimum fluidization velocity, wherein the large lump discharge device is connected with the perforated gas distributing plate under the fluidized bed just blow the material supply chute and environs.

8. A multi-chamber fluidized bed classifying apparatus as claimed in claim 1, further comprising an exchangeable liner mounted on the perforated gas distributing plate, for preventing it from being worn.

9. A multi-chamber fluidized bed classifying apparatus as claimed in claim 1, further comprising:
a dam arranged in the vicinity of the perforated gas distributing plate's end on the side of the grains discharge chute; and
a classifying gas introductory nozzle connected to the material exhaust port, for returning the fines overflowing the dam to the classifying chamber.

10. A multi-chamber fluidized bed classifying apparatus as claimed in claim 9, wherein a clearance is defined between a lower end of the dam and an upper face of the perforated gas distributing plate, for allowing the movement of large lumps.

11. A multi-chamber fluidized bed classifying apparatus as claimed in claim 1, further comprising:
a dam arranged in the vicinity of the perforated gas diffusing plate's end on the side of the grains discharge chute;
a classifying plate arranged above the dam, for reducing a cross-sectional area of a space defined between the classifying plate and the dam thereby to improve the classification efficiency of the apparatus; and
a classifying gas introductory nozzle connected to the grains discharge chute, for allowing gas to flow between the dam and the classifying plate thereby to return the fines overflowing the dam to the classifying chamber.

12. A multi-chamber fluidized bed classifying apparatus as claimed in claim 11, wherein at least either one of the dam and the classifying plate is constructed so as to be adjustable in height, whereby the cross-sectional area of space defined between the classifying plate and the dam can be varied to control a classification quantity.

13. A multi-chamber fluidized bed classifying apparatus as claimed in claim 11, wherein the classifying plate is so constructed that at least either one of height and angle thereof is adjustable, whereby the cross-sectional area of the space defined between the classifying plate and the dam can be varied to control classification quantity.

14. A multi-chamber fluidized bed classifying apparatus as claimed in claim 1, wherein the grains discharge chute is divided by a partition wall thereby to define a large lump discharge chute on the perforated gas distributing plate's side of the grains discharge chute, the large lump discharge chute being provided, on its lateral side, with a fluidization gas blowing nozzle for allowing the fluidization of particles in an upper part of the large lump discharge chute thereby to discharge the large lumps selectively.

15. A multi-chamber fluidized bed classifying apparatus as claimed in claim 14, wherein the partition wall is arranged so that an upper end thereof is higher than an upper face of the perforated gas distributing plate.

16. A multi-chamber fluidized bed classifying apparatus as claimed in claim 1, wherein the grains discharge chute has a large lump discharge chute arranged on the perforated gas distributing plate's side adjacent to a discharge part of the grains discharge chute and also connected with a large lump discharge chute provided, on its lateral side, with a fluidization gas blowing nozzle for allowing the fluidization of particles in an upper part of the large lump discharge chute thereby to discharge the large lumps selectively.

17. A multi-chamber fluidized bed classifying apparatus as claimed in claim 1, wherein:
the grains discharge chute is divided by a partition wall thereby to define a large lump discharge chute on the perforated gas distributing plate's side of the grains discharge chute, the large lump discharge chute being provided, on its lateral side, with a fluidization gas blowing nozzle for allowing the fluidization of particles in an upper part of the large lump discharge chute thereby to discharge the large lumps selectively;
the large lump discharge chute has a slanted part formed on a lower section of the large lump discharge chute, the slanted part having, on its bottom side, a partition wall providing a sieve structure at least partially; and
the grains discharge chute further includes another partition wall for forming a space below the sieve structure;
whereby small particles diving into the large lump discharge chute can be sieved into the space below the sieve structure and finally returned to the grains discharge chute.

* * * * *